US005138925A

United States Patent [19]

Koguchi et al.

[11] Patent Number: 5,138,925

[45] Date of Patent: Aug. 18, 1992

[54] APPARATUS FOR PLAYING AUTO-PLAY DATA IN SYNCHRONISM WITH AUDIO DATA STORED IN A COMPACT DISC

[75] Inventors: Satoru Koguchi, Tokyo; Yoshiyuki Murata, Oome, both of Japan

[73] Assignee: Casio Computer Co., Ltd., Tokyo, Japan

[21] Appl. No.: 547,061

[22] Filed: Jun. 29, 1990

[30] Foreign Application Priority Data

Jul. 3, 1989 [JP] Japan .................................. 1-171618
Jul. 3, 1989 [JP] Japan .................................. 1-171619
Jul. 3, 1989 [JP] Japan .................................. 1-171620
Jul. 3, 1989 [JP] Japan .................................. 1-171621

[51] Int. Cl.$^5$ ........................ G09B 15/04; G10H 1/02; G10H 1/06; G10H 7/00

[52] U.S. Cl. ........................................ 84/609; 84/622; 84/626; 84/478

[58] Field of Search .................................. 84/609-614, 84/634-638, DIG. 12, DIG. 22, 622-633, 477 R, 478

[56] References Cited

U.S. PATENT DOCUMENTS 3,829,597 8/1974 Peterson et al. .
4,357,854 11/1982 Hirano .......................... 84/DIG. 12
4,417,494 11/1983 Nakada et al. ........................ 84/612
4,508,001 4/1985 Suzuki .
4,566,362 1/1986 Kikumoto .
4,624,171 11/1986 Yuzawa et al. .
4,633,751 1/1987 Fukaya et al. ................ 84/DIG. 22
4,667,556 5/1987 Hanzawa et al. .

FOREIGN PATENT DOCUMENTS 0303700 2/1977 European Pat. Off. .
54-161313 12/1979 Japan .
62-146470 6/1987 Japan .
62-138361 9/1987 Japan .
1-25078 5/1989 Japan .
1-199385 8/1989 Japan .
2-141961 5/1990 Japan .
2120441 3/1983 United Kingdom .

*Primary Examiner*—Stanley J. Witkowski
*Attorney, Agent, or Firm*—Frishauf, Holtz, Goodman & Woodward

[57] ABSTRACT

Audio data of a predetermined piece of music is recorded on a compact disc. A sequence of musical tone data is stored in an auto-play memory. Also stored in this auto-play memory are a time control command, an access command and a play command. An instrument controller reads out these commands to surely control the auto-playing and reproduction of data from the compact disc in synchronism.

39 Claims, 19 Drawing Sheets

| | Q1 Q2 Q3 Q4 | Q5 Q6 Q7 Q8 | Q9 Q10 Q11 Q12 Q13 Q14 Q15 Q16 | |
|---|---|---|---|---|
| | FLAG | 0 0 0 1 | 0 0 0 0 0 0 0 0 | |
| Q17 | POINT | | RUNNING TIME (MINUTES) | Q32 |
| Q33 | RUNNING TIMER (SECOND) | | RUNNING TIME (FRAME NO.) | Q48 |
| Q49 | 0 0 0 0 | 0 0 0 0 | ABSOLUTE TIME (MINUTES) | Q64 |
| Q65 | ABSOLUTE TIME (SECOND) | | ABSOLUTE TIME (FRAME NO.) | Q80 |
| Q81 | ERROR DETECTION CODE (CRC CODE) | | | Q96 |

FIG.5

| | Q1 Q2 Q3 Q4 | Q5 Q6 Q7 Q8 | Q9 Q10 Q11 Q12 Q13 Q14 Q15 Q16 | |
|---|---|---|---|---|
| | FLAG | 0 0 0 1 | TRACK NO. | |
| Q17 | INDEX | | RUNNING TIME (MINUTES) | Q32 |
| Q33 | RUNNING TIME (SECOND) | | RUNNING TIME (FRAME NO.) | Q48 |
| Q49 | 0 0 0 0 | 0 0 0 0 | ABSOLUTE TIME (MINUTES) | Q64 |
| Q65 | ABSOLUTE TIME (SECOND) | | ABSOLUTE TIME (FRAME NO.) | Q80 |
| Q81 | ERROR DETECTION CODE (CRC) | | | Q96 |

FIG.6

| |
|---|
| ABSOLUTE TIME OF THE STARTING POINT (MINUS A AUDIO DATA OF 1ST PIECE ) |
| ABSOLUTE TIME OF THE STARTING POINT (MINUS B AUDIO DATA OF 1ST PIECE ) |
| ABSOLUTE TIME OF THE STARTING POINT (A PART SUBCODE DATA OF 1ST PIECE ) |
| ABSOLUTE TIME OF THE STARTING POINT (B PART SUBCODE DATA OF 1ST PIECE ) |
| ABSOLUTE TIME OF THE STARTING POINT (MINUS A AUDIO DATA OF 2ND PIECE ) |
| ABSOLUTE TIME OF THE STARTING POINT (MINUS B AUDIO DATA OF 2ND PIECE ) |
| ABSOLUTE TIME OF THE STARTING POINT (A PART SUBCODE DATA OF 2ND PIECE ) |
| ABSOLUTE TIME OF THE STARTING POINT (B PART SUBCODEDATA OF 2ND PIECE ) |
| ⋮ |

FIG. 11

MIDI MESSAGE

| | TYPE OF MESSAGE | STATUS | DATA 1 | DATA 2 |
|---|---|---|---|---|
| VOICE MESSAGE | 501 NOTE ON | 9X | 5011 NOTE NO. | 5012 VELOCITY |
| | 502 NOTE OFF | 8X | 5021 NOTE NO. | 5022 OFF VELOCITY |
| | 503 PROGRAM CHANGE | CX | 5031 PROGRAM NO. | |
| EXCLUSIVE MESSAGE FOR CD-MIDI | 504 TONE LENGTH CONTROL COMMAND | | | |

| FO | ID FOR CD-MIDI | TONE LENGTH CONTROL COMMAND | TONE LENGTH DATA | F7 |
|---|---|---|---|---|
| | 5041 | 5042 | 5043 | |

FIG.12

| POINT | CONTENTS OF ABSOLUTE TIME DATA |
|---|---|
| 0 0 0 0 0 0 0 1 | ABSOLUTE TIME OF STARTING POINT OF PART A |
| 0 0 0 0 0 0 1 0 | ABSOLUTE TIME OF STARTING POINT OF PART B |
| 0 0 0 0 0 0 1 1 | ABSOLUTE TIME OF STARTING POINT OF SOUND EFFECT C |
| 0 0 0 0 0 1 0 0 | ABSOLUTE TIME OF STARTING POINT OF SOUND EFFECT D |
| 0 0 0 0 0 1 0 1 | ABSOLUTE TIME OF STARTING POINT OF SAMPLE SOUND a |
| 0 0 0 0 0 1 1 0 | ABSOLUTE TIME OF STARTING POINT OF SAMPLE SOUND b |
| 0 0 0 0 0 1 1 1 | ABSOLUTE TIME OF STARTING POINT OF SAMPLE SOUND c |
| 1 1 1 1 0 0 0 1 | ABSOLUTE TIME OF STARTING POINT OF AUTO-PLAY MUSIC DATA 1 |
| 1 1 1 1 0 0 1 0 | ABSOLUTE TIME OF STARTING POINT OF AUTO-PLAY MUSIC DATA 2 |

FIG.23

FIG.27(a)

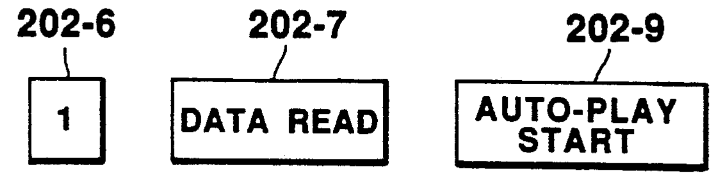

FIG.27(b)

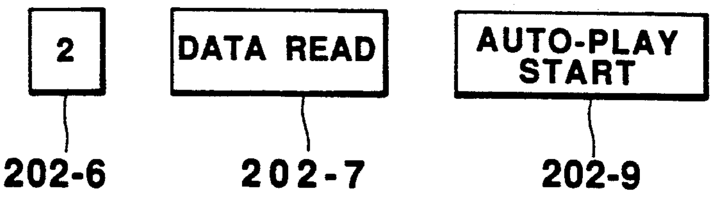

| | TYPE OF MESSAGE (601) STATUS | (602) DATA 1 | (603) DATA 2 |
|---|---|---|---|
| TYPE OF MESSAGE | STATUS | DATA 1 | DATA 2 |
| 604 NOTE ON | 9X | NOTE NO. | VELOCITY |
| 605 NOTE OFF | 8X | NOTE NO. | OFF VELOCITY |
| 606 PROGRAM CHANGE | CX | PROGRAM NO. | |
FIG. 24
(TYPE OF MESSAGE)
FIG. 25(a) SAMPLING COMMAND
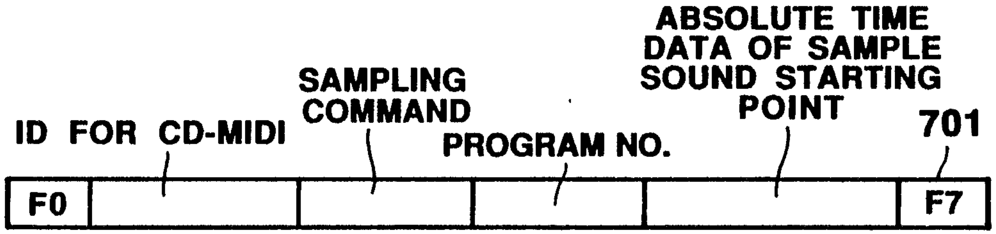
FIG. 25(b) STARTING POINT ACCESS COMMAND
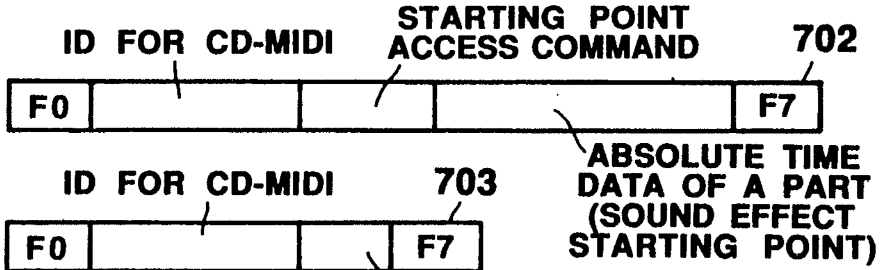
FIG. 25(c) PLAY COMMAND
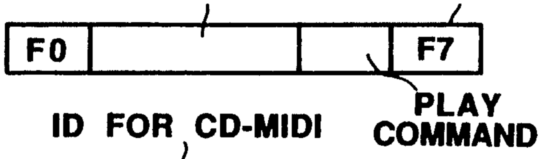
FIG. 25(d) TONE LENGTH CONTROL COMMAND
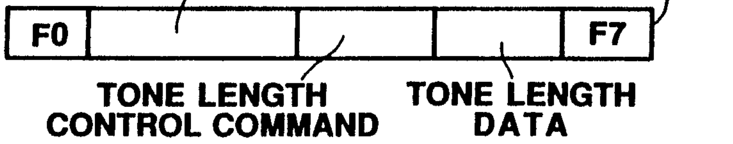

ORDER OF EXECUTION ↓

| | |
|---|---|
| SAMPLING COMMAND | 701-1 |
| SAMPLING COMMAND | 701-2 |
| SAMPLING COMMAND | 701-3 |
| PROGRAM CHANGE | 606-1 |
| NOTE ON | 604-1 |
| TONE LENGTH CONTROL COMMAND | 704-1 |
| NOTE OFF | 605-1 |
| NOTE ON | 604-2 |
| TONE LENGTH CONTROL COMMAND | 704-2 |
| NOTE OFF | 605-2 |
| ⋮ | |
| PROGRAM CHANGE | 606-2 |
| NOTE ON | 604-3 |
| TONE LENGTH CONTROL COMMAND | 704-3 |
| NOTE OFF | 605-3 |
| ⋮ | |
| NOTE ON | 604-1 |
| STARTING POINT ACCESS COMMAND | 702-1 |
| TONE LENGTH CONTROL COMMAND | 704-4 |
| NOTE OFF | 605-4 |
| ⋮ | |
| NOTE ON | 604-5 |
| PLAY COMMAND | 703-1 |
| TONE LENGTH CONTROL COMMAND | 704-5 |
| NOTE ON | 605-5 |
| ⋮ | |
| STOP MESSAGE | stp |

FIG. 26

APPARATUS FOR PLAYING AUTO-PLAY DATA IN SYNCHRONISM WITH AUDIO DATA STORED IN A COMPACT DISC

BACKGROUND OF THE INVENTION

1. Field of the Invention

The present invention relates to an auto-playing apparatus which uses a recording medium having audio data recorded thereon and memory means storing auto-play data to ensure reproduction of the audio data in synchronism with auto-playing based on the auto-play data.

2. Description of the Related Art

Auto-playing apparatuses for use in an electronic musical instrument store pitch data and tone length data, corresponding to each note of a piece of music, into a semiconductor memory according to the progress of the music, reads out these data from the memory and sends them to a tone generator to automatically play the music as memorized. Such auto-playing apparatuses have been proposed and many electronic musical instruments available on the market today have such a function. The technique of an auto-playing apparatus of this type is disclosed in detail in, for example, U.S. Pat. No. 4,624,171 by Yuzawa et al.

The auto-playing apparatuses are very effective in learning how to play music with an electronic musical instrument, because auto-playing based on auto-play data as a model performance prior to such learning permits a player to easily grasp the whole image of the music to be played. In addition, the player can objectively judge one's own musical performance by executing auto-playing based on key operating signals, which have been produced by the performance and stored as auto-play data in the memory.

A music piece generally consists of a plurality of melodies that are to be played by a plurality of instruments. The learning effect would be further improved if the music, including the entire melody, is played in the background when playing a specific part of the melody. Playing a melody part while listening to the music being played in the background makes it easier for one to grasp the timing for the melody part that the player should play. In this case, as described above, the learning effect would be enhanced by using the aforementioned auto-playing apparatus to auto-play in advance the melody part that the player should play.

This situation can be realized by preparing a recording medium, such as a compact disc or digital audio tape, on which pieces of music are recorded, setting it on a player and playing the desired piece of music while driving the auto-playing apparatus to automatically reproduce auto-play data of a melody part therefrom that one should play.

Unless a switch to start playing the recording medium and a switch to start the auto-playing are operated at predetermined timings, however, sounds reproduced from the recording medium and the auto-playing apparatus would not be synchronized, thus preventing the learning effect from further being improved. If the playing of the recording medium and the auto-playing are to be started at the same timing, both switches should be operated at exactly the same time. If the auto-playing is to start during reproduction of the recording medium, the auto-play start switch should be operated while carefully listening to the reproduced sounds from the recording medium. On the other hand, the recording-medium play start switch should be operated when one desires to start playing the recording medium during the auto-playing. In any case, it is very difficult or unlikely to provide the accurate timings for manually operating those switches.

SUMMARY OF THE INVENTION

Accordingly, it is an object of the present invention to surely synchronize reproduction of a recording medium and auto-playing of auto-play data.

To achieve this object, according to this invention, there is provided an auto-playing apparatus comprising:

memory means for storing auto-play data;

auto-playing means, connected to the memory means, for reading the auto-play data therefrom and sequentially generating corresponding musical tone signals;

a recording medium for storing audio data;

reproducing means, connected to the recording medium, for reproducing the audio data therefrom; and control means, connected to the auto-playing means and the reproducing means, for controlling the auto-playing means and the reproducing means in response to a start signal to synchronize the start of reproduction of the recording medium with the start of auto-playing of the auto-play data.

According to the present invention, it is possible to synchronize perfectly the reproduction of the recording medium and the auto-playing. Therefore, an auto-play giving a rich presence can be performed while a piece of music is reproduced from the recording medium as background music. When a melody data obtained by performing a melody by a player is stored as an auto-play data, it is possible to easily grasp a starting time of the melody to be played and an image of the melody in the progress of the entire piece of music. Thus, the auto-playing apparatus of the present invention can be used for learning how to play a music piece.

These and other objects and features as well as advantages of this invention will become more apparent from the following detailed description of embodiments as illustrated in the accompanying drawings.

BRIEF DESCRIPTION OF THE DRAWINGS

FIG. 5 is a diagram illustrating the content of a control bit Q in a lead-in area on the compact disc (105);

FIG. 6 is a diagram illustrating the content of a control bit Q in a program area on the compact disc (105);

FIG. 11 is a diagram illustrating the contents of the TOC on the compact disc (105A) in the first embodiment;

FIG. 12 is a diagram illustrating MIDI messages used as auto-play data in the first embodiment;

FIG. 23 is a diagram illustrating the contents of the TOC on the compact disc (105B) in the second embodiment;

FIG. 24 is a diagram illustrating a MIDI message used as auto-play data in the second embodiment;

FIGS. 25(*a*) to 25(*d*) are diagrams illustrating a MIDI message used as auto-play data in the second embodiment;

FIG. 26 is a diagram exemplifying auto-play data in the second embodiment; and FIGS. 27(*a*) and 27(*b*) are diagrams exemplifying key operations in the second embodiment.

DETAILED DESCRIPTION OF THE PREFERRED EMBODIMENTS

First Embodiment

The first preferred embodiment of the present invention will now be described referring to FIGS. 1 through 20.

Audio data recorded on a compact disc (CD) used in the first embodiment includes L channel data and R channel data. The L channel data may be audio data of a piece of music without a piano part, and the R channel data may be audio data of the same music without a violin part. As subcodes of the CD, auto-play data for the piano part of the piece of music and auto-play data for the violin part are recorded.

When one wants to practice the piano part of that music piece or use an electronic keyboard instrument to auto-play a melody of the piano part, he performs a predetermined key operation to play the CD to read out the auto-play music data of the piano part recorded as a subcode and temporarily store the data in an auto-play memory. The data stored in this memory is sequentially read out and LEDs on the keyboard are lit or auto-playing is performed according to the data. At the same time, the audio data of the L channel excluding the piano part can be synchronously reproduced from the CD. The auto-play music data of the subcode includes timbre designation data so that a piano's timbre is automatically set for the audio data to be reproduced.

Likewise, when one wants to practice the violin part of the music piece or use an electronic musical instrument to auto-play a melody of the violin part, audio data of the R channel excluding the violin part can be simultaneously reproduced from the CD.

The electronic keyboard instrument is an electronic musical instrument with a PCM tone generator, so that the ordinary manual playing is possible using timbre data stored in advance in a wave memory.

General Arrangement

Figure 1:
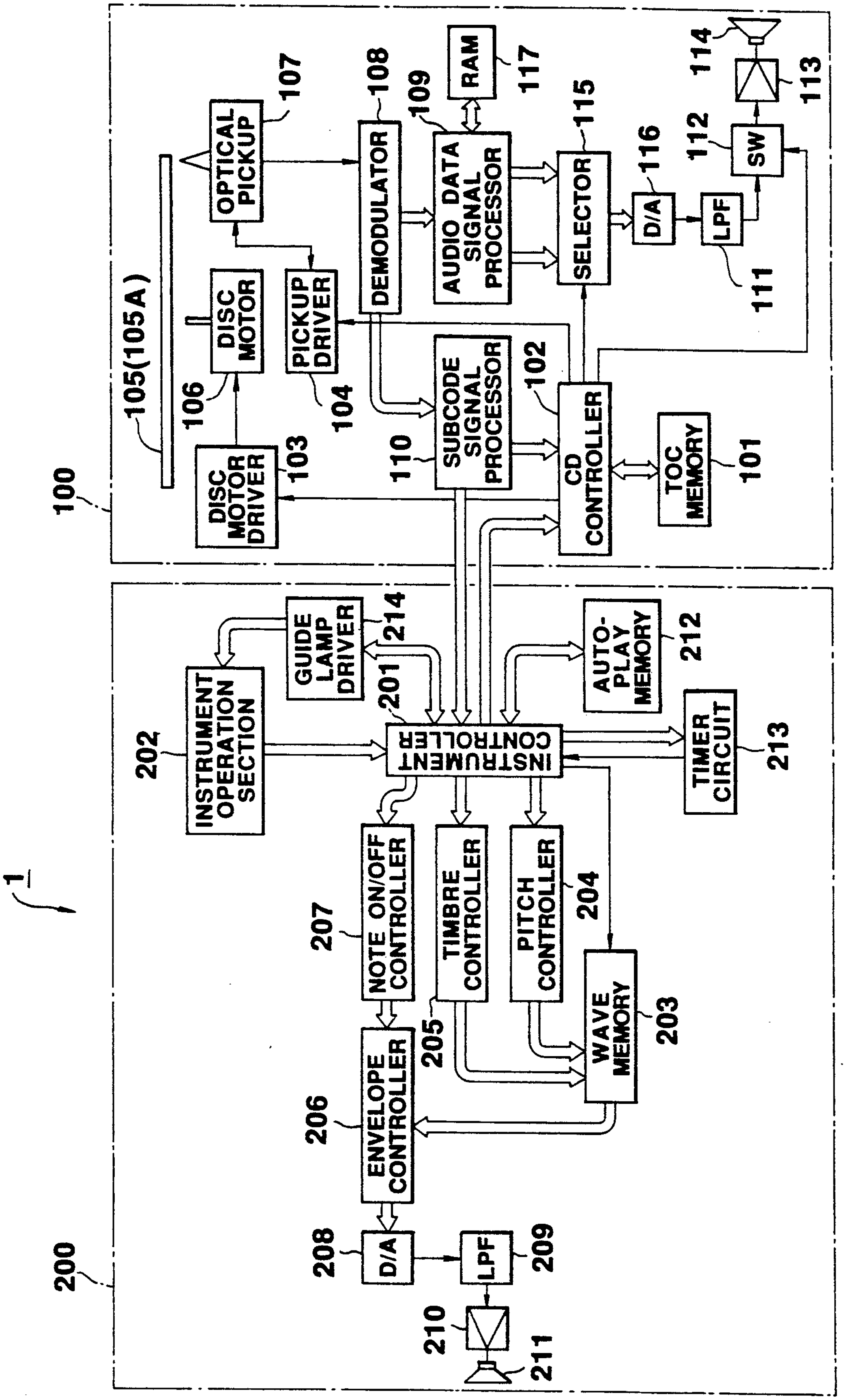
FIG. 1 is a block circuit diagram illustrating the general structure of the first embodiment of an auto-playing apparatus (1) according to the present invention.

FIG. 1 is a block diagram illustrating the general circuit arrangement of an auto-playing apparatus 1 or the first embodiment of the present invention, which is provided with an electronic keyboard instrument and a CD player.

This auto-playing apparatus 1 has an auto-playing function and a guide-playing function to specify which keys on the keyboard should be operated on the basis of auto-play data.

Referring to FIG. 1, a block 100 surrounded by a one-dot chain line is a CD player section and a block 200 also surrounded by a one-dot chain line is an electronic keyboard instrument section.

To begin with, the block arrangement of the CD player section 100 will be described.

A CD 105 is set in a holder section (not shown) of the CD player section 100. In this embodiment, the CD player section 100 can play a compact disc, which has minus-one play music data and auto-play music data recorded thereon and is played particularly by the apparatus of this embodiment, in addition to a compact disc for reproduction of ordinary audio data. In the following description, the compact disc is simply referred to as CD 105 in a general case while it is referred to as customized CD 105A when it is necessary to describe the former, special compact disc.

A TOC (Table of Contents) memory 101 stores TOC data of a lead-in area which is to be read out when the CD 105 is set on the CD player section 100. The TOC data will be described later.

A CD controller 102 may be a microprocessor which performs the general control of the CD player section 100. The CD controller 102 exchanges various types of data between a subcode signal processor 110, an instrument controller 201 and the TOC memory 101. In driving the CD 105, the CD controller 102 sends a drive control signal to a disc motor driver 103 and a pickup driver 104. In executing guide-playing or auto-playing, the CD controller 102 controls a selector 115 to select minus-one play music data recorded c,n either in the L or R channel. In reading out auto-play music data, the CD controller 102 sets off an analog switch (SW) 112 (to be described later) to cause tone-off of a reproduced tone from the CD 105.

The disc motor driver 103 controls the number of rotations of a disc motor 106 that drives the CD 105, so as to make constant the linear velocity at the time an optical pickup 107 traces tracks on the CD 105.

The pickup driver 104 executes the focus servo and tracking servo of the optical pickup 107 which irradiates a laser beam on the tracks on the CD 105. The focus servo is to detect a focus error from the status of reflection light of the laser beam and control the driving of an objective lens in the optical pickup 107 in the direction of the optical axis based on the focus error. The tracking servo is to control the laser beam from the optical pickup 107 to be accurately focused onto the center of a target track on the CD 105 by moving the laser beam in the radial direction of the CD 105 while detecting a deviation of the laser beam from the center of the target track on the CD 105. In FIG. 1, a pickup feed motor for moving the optical pickup 107 in the radial direction of the CD 105 is included in the pickup driver 104.

Upheavals called pits are formed on that face of the CD 105 where the laser beam is to be irradiated, and PCM (Pulse Code Modulation) signals are recorded by the pits. The optical pickup 107 detects presence/absence of pits based on the amount of reflected light of the irradiated laser beam and sends an electric signal corresponding to the presence/absence and the length of pits to a demodulator 108.

The demodulator 108 detects a frame sync signal from the electric signal from the optical pickup 107 to discriminate the partition between symbol words, and subjects an EFM (Eight to Fourteen Modulation) modulated 14-bit symbol word in each frame to EFM demodulation to convert it to the original 8-bit symbol word. Of the EFM-demodulated symbol words, one containing audio data is sent to an audio data signal processor 109 and one containing a subcode is sent to the aforementioned subcode signal processor 110.

The former signal processor 109 writes input audio data into a RAM (Random Access Memory) 117, and performs an error correction based on a Reed-Solomon code as well as a de-interleaving process to restore 16-bit digital audio data frame by frame. The digital audio data is sent to the selector 115.

The selector 115 selects digital audio data of either the L channel or R channel based on a command from the CD controller 102, and sends it to a D/A (Digital/Analog) converter 116.

The D/A converter 116 converts the received digital audio data into an analog audio signal, which is sent to the analog switch 112 via an LPF (Low-pass Filter) 111 having a cutoff frequency, a half of the sampling frequency.

The switching (ON/OFF) of the analog switch 112 is controlled by the CD controller 102. The analog audio signal output from the LPF 111 is produced as a sound through an amplifier 113 and a loudspeaker 114 when the switch 112 is closed.

The subcode signal processor 110 performs an error detection, error correction and de-interleaving process on an 8-bit subcode including a MIDI (Musical Instrument Digital Interface) message to restore the subcode, as will be described later. Of the restored 8-bit subcode, two control bits P and Q are output to the CD controller 102, and the remaining six user's bits, R, S, T, U, V and W, are output to the instrument controller 201 in the electronic keyboard instrument 200.

A description will now be given of the block arrangement of the electronic keyboard instrument 200.

Figure 2:
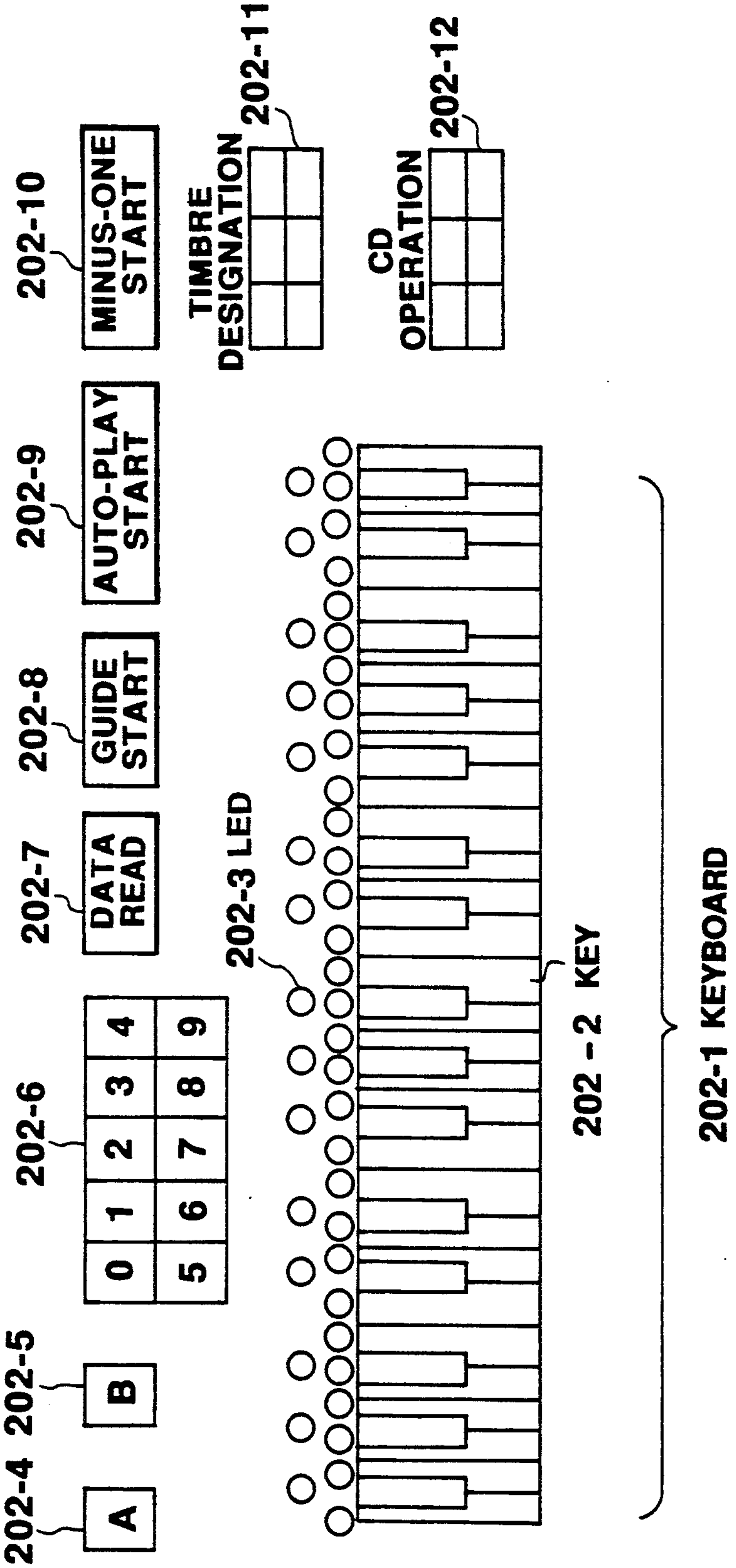
FIG. 2 is a detailed diagram of an instrument operating section (202) of the first and second embodiments.

An instrument operating section 202 has a structure as shown in FIG. 2. Part designation keys 202-4 and 202-5 are used to select part play data from an A part and a B part. A music designation key 202-6 designates a piece of music at the time of guide-playing or auto-playing. A data read key 202-7 instructs reading of auto-play music data of a subcode. A guide start key 202-8 instructs to start guide-playing. An auto-play start key 202-9 instructs to start auto-playing. A minus-one start key 202-10 instructs to perform a minus-one play. Timbre designation keys 202-11 specify the timbre of a musical tone. The instrument operating section 202 further includes a keyboard 202-1, which has a plurality of keys 202-2. At the upper portion of each key 202-2, an LED 202-3 is provided which is selectively lit at the time the guide-play function is performed. Further, CD operation switches 202-12 are provided which include a PLAY switch, STOP switch, PAUSE switch and a music select switch, as provided on an ordinary CD player.

Returning to FIG. 1, the instrument controller 201 may be a microprocessor, as mentioned earlier, and monitors the operational status of various keys of the instrument operating section 202 (see FIG. 2) at given intervals. The controller 201 sets pitch data corresponding to a depressed key 202-2 and sets timbre data (program number) specified by a timbre designation key 202-11. The controller 201 also performs a process for guide-play/auto-play and a process for driving the CD, which will be described later, and gives a control instruction to the CD controller 102 as needed.

A guide lamp driver 214 selectively lights the LEDs 202-3 of the instrument operation section 202 (see FIG. 2) at the time of guide-playing under the control of the instrument controller 201.

A wave memory 203 has a ROM (Read Only Memory) in which wave data of various musical tones are stored in advance in the form of digital codes in the PCM system, an address counter for accessing the ROM and first and second address registers in which the initial value and accumulated value of this counter are respectively set.

The instrument controller 201 sends pitch data, set in response to a note ON command at the time of key depression or auto-playing, to a scale controller 204, and sends timbre data (program number), set in response to a program change command at the time of operating the timbre designation keys 202-11 or auto-playing, to a timbre controller 205.

The timbre controller 205 sets the head address of a memory area in the wave memory 203 where wave data of a timbre corresponding to a program number received from the instrument controller 201, the first address register (not shown) in the wave memory 203.

The scale controller 204 sets the address interval corresponding to the pitch data given from the instrument controller 201, into the second address register (not shown) in the wave memory 203. The address counter (not shown) in the wave memory 203 sequentially accumulates the address by the address interval set in the second address register from the head address set in the first address register, and accesses the ROM in the memory 203 to read the instantaneous value of the wave data of the timbre corresponding to the aforementioned, set timbre data (program number) from the ROM. The wave data read out from the wave memory 203 is output to an envelope controller 206.

Further, upon detection of key depression or a note ON command of auto-play music data, the instrument controller 201 outputs a note ON signal and velocity data corresponding to the key depressing speed to a note ON/OFF controller 207. Upon detection of key releasing or a note OFF command of the auto-play music data, the controller 201 outputs a note OFF signal and OFF velocity data corresponding to the key releasing speed to the note ON/OFF controller 207.

Based on the note ON/OFF signal and velocity data or OFF velocity data from the instrument controller 201, the note ON/OFF controller 207 controls the envelope controller 206 to produce envelope data corresponding to the velocity data and OFF velocity data. In other words, the note ON/OFF controller 207 associates the attack time of an envelope with the velocity data and the release time of the envelope with the OFF velocity data so as to produce envelope data.

The envelope controller 206 generates envelope data of a predetermined shape in accordance with a control signal from the note ON/OFF controller 207, and multiplies the envelope data by wave data given from the wave memory 203. The resultant value is output to a D/A converter 208.

The D/A converter 208 and an LPF 209 having a cut-off frequency, at half the sampling frequency, converts the received wave data (the multiplied value), which has undergone the envelope control, into an analog wave signal. The resultant signal is produced as a sound through an amplifier 210 and a loudspeaker 211.

The instrument controller 201 converts a sequence of 6-bit data of R to W (to be described later) from the subcode signal processor 110 into an 8-bit MIDI message and writes the message into an auto-play memory 212 constituted of a RAM.

The MIDI message to be written in the auto-play memory 212 is auto-play music data stored in a subcode on the customized CD 105A, as will be described in detail later; that is, the message is a MIDI message of auto-play music data selected by the music designation keys 202-6 and data read key 202-7 of the instrument operating section 202.

A timer circuit 213 has a time counter, a buffer for tone length data and a comparator, though none are shown, and measures the time corresponding to the tone length data at the time of guide-playing or auto-playing based on the MIDI message stored in the auto-play memory 212.

CD Recording Format

The recording format of digital data on the CD 105 will be described below.

Figure 3:
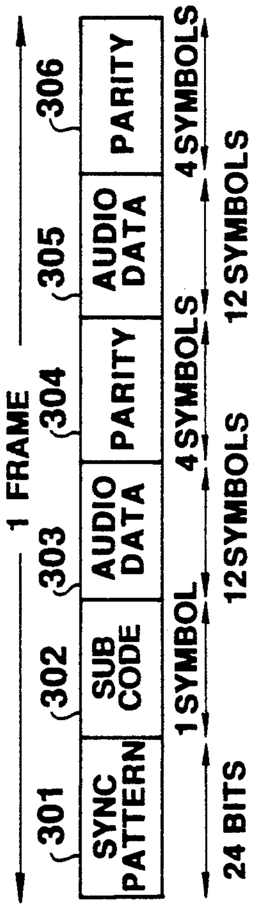
FIG. 3 is a diagram showing a frame format of a compact disc (105)

As illustrated in FIG. 3, digital data is recorded in a unit called frame in which a sync pattern (synchronize pattern) 301 consisting of 24 channel bits, a subcode 302 for one symbol, audio data 303 for 12 symbols, a parity word 304 for 4 symbols, audio data 305 for 12 symbols and a parity word 306 for 4 symbols are arranged in the named order.

In a data sequence of the above frame form, one symbol in FIG. 3 consists of 8-bit data at a stage before EFM modulation. Audio data to be recorded on the CD 105 is digital data of which each sample is sampled at 44.1 KHz and quantized by 16 bits. Therefore, each sample is expressed by two symbols. As the audio data 303 and 305 for 24 symbols in total are recorded in one frame in FIG. 3, audio data for 12 samples is recorded in one frame. The parity words 304 and 306 are called a CIRC (Cross Interleave Reed-Solomon Code).

Figure 4:
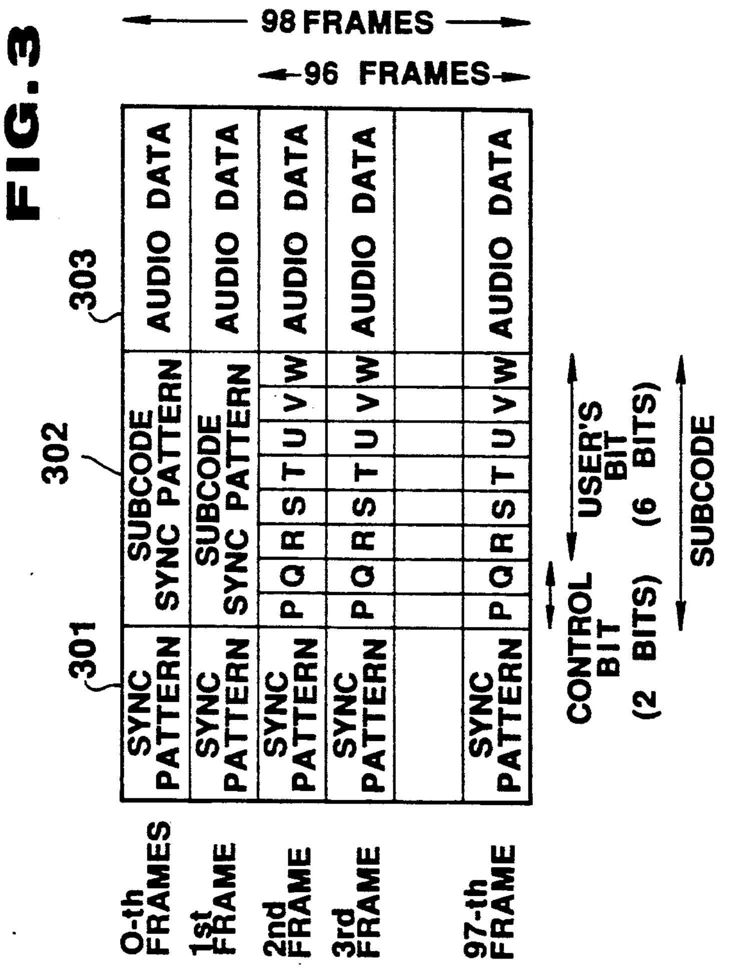
FIG. 4 is a diagram illustrating the format of a subcoding frame of the compact disc (105)
Figure 7:
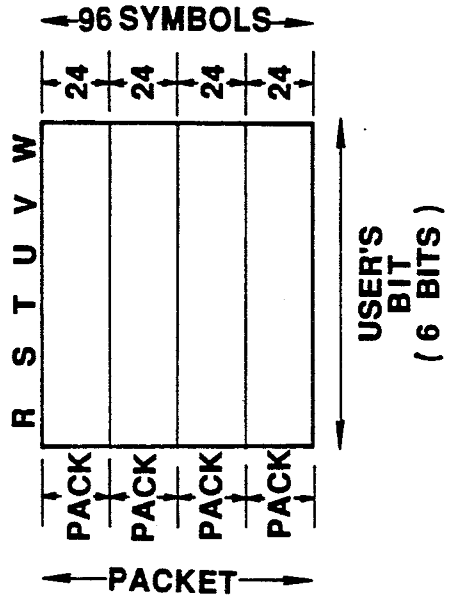
FIG. 7 is a diagram of a packet format of the compact disc (105)

FIG. 4 shows a data format with a subcode at the center. The individual bits of each 8-bit subcode 302 per frame are called P, Q, R, S, T, U, V and W, respectively. As shown in FIG. 4, 8-bit subcodes for 98 frames are grouped as one subcoding frame, and 8-bit subcodes of the 0-th frame and first frame of the 98 frames are sync patterns for the subcoding frame. The subcode signal processor 110 (to be described in detail later) shown in FIG. 1 uses these subcoding-frame recognition sync patterns to recognize the subcodes P through W of each of the second to 97-th frames.

The first two bits, P and Q, of each of the second to 97-th frames are control bits used for system control. More specifically, the control bit P is data indicating an interval between pieces of music and inside a piece of music; the bit is set to 1 when the associated frame corresponds to an interval between pieces of music and no audio data 303 and 305 (see FIG. 3) are present, and is set to 0 when the frame corresponds to a point inside a piece of music and the audio data are present.

A description will now be given of the control bit Q. various types of data are recorded on the CD 105 outward from an inner track, and the innermost track region (having a diameter of 46 to 50 mm) is called a lead-in area. TOC information corresponding to the table of contents of the whole pieces of music recorded on a single CD are recorded in this lead-in area using the control bits Q of the subcodes in the data to be recorded in the units of frames as explained above referring to FIG. 3.

With reference to FIG. 5, the control bits Q in the TOC information for one piece of music will be described below.

Referring to FIG. 5, Q1, Q2, . . . , and Q96 respectively correspond to the control bits Q of the second frame to the 97-th frame in FIG. 4.

Q1 through Q4 are a flag which is used to discriminate the number of channels of audio data and presence/absence of emphasis. The next four bits, Q5 to Q8, are "0001" and the subsequent eight bits, Q9 to Q16, are all 0. The next eight bits, Q17 to Q24, are a point representing data of a track number (music number). The next three eight bits represent the running times expressed in terms of minutes, seconds and frame number, which will be described later; these are data, which increase till the end of the lead-in area with the beginning of this area as 0, are used by the internal system and are not particularly indicated externally.

The next eight bits, Q49 to Q56, are all 0, and the subsequent three 8-bit groups represent the absolute times expressed in terms of minutes, seconds and frame number. These three time data represent the starting point of each piece of music in a program area, which corresponds to the aforementioned point, as the time elapsed from the starting point of the program area. For instance, with a CD having three pieces of music recorded thereon, the absolute times from the starting points of these pieces of music are recorded for points 01, 02 and 03, respectively.

The last sixteen bits are an error detection code (CRCC: Cyclic Redundancy Check Code). The CRCC, one type of error detection code, is the remainder of data bits divided by a given number, which is used as check bits.

Following the lead-in area is a program area in which audio data is recorded in the units of frames as shown in FIG. 3. Various types of time data shown in FIG. 6 are recorded using the control bits Q of the subcodes in the frames. The time data corresponds to address data in a memory device. With regard to the subcodes, since 98 frames (time for one frame is 136.05$\mu$ sec) are treated as one subcoding frame, as described referring to FIG. 4, it is possible to record the time for one subcoding frame (136.05$\mu$ sec$\times$98), i.e., time data in the units of 1/75 second.

Referring to FIG. 6, the first and second four bits are the same as those of the control bits Q of the TOC data described referring to FIG. 5. The next eight bits indicate a track (music) number, and the following eight bits are an index which represents the details of the track number. The next three 8-bit sets represent absolute times indicating the times elapsed from the starting point of each piece of music expressed in terms of minutes, seconds and frame number, and the indication is updated every 1/75 second. The next eight bits are all 0. The subsequent three 8-bit sets represent absolute times indicating the times elapsed till the point of the subcoding frame from the starting point of the program area with the accuracy of 1/75 second, as in the case of the TOC data described referring to FIG. 5. The last sixteen bits are the aforementioned error detection code (CRCC).

The subcodes for 98 frames constitute one subcoding frame which corresponds to 1/75 second, as explained earlier referring to FIG. 4, so that a sequence of data for 75 subcoding frames is the same second data.

75 subcoding frames in the same second data are given sequential subcoding frame numbers, from 0 to 74, which have been called the frame numbers for short in the foregoing description.

If all the TOC data described referring to FIG. 5 is read out, the absolute time data from the starting point of each piece of music corresponding to each music number can be detected in the unit of one subcoding frame, i.e., with the accuracy of 1/75 second.

Accordingly, in accessing each piece of data on a CD, the CD controller 102 reads out the TOC data to accurately access to an arbitrary position of data.

The bits R to W of the subcode will be described below.

The bits R to W are called user's bits and their use as data of a still picture or the like has already been standardized. In this embodiment, MIDI data is recorded in these user's bits, as will be described later. With regard to the user's bits R to W of the second to 97-th frames of the subcoding frame consisting of 98 frames as shown in FIG. 4, 96 symbols (one symbol consisting of six bits, R to W) are called a packet which includes four packs of data, each pack corresponding to 24 symbols.

Figure 8:
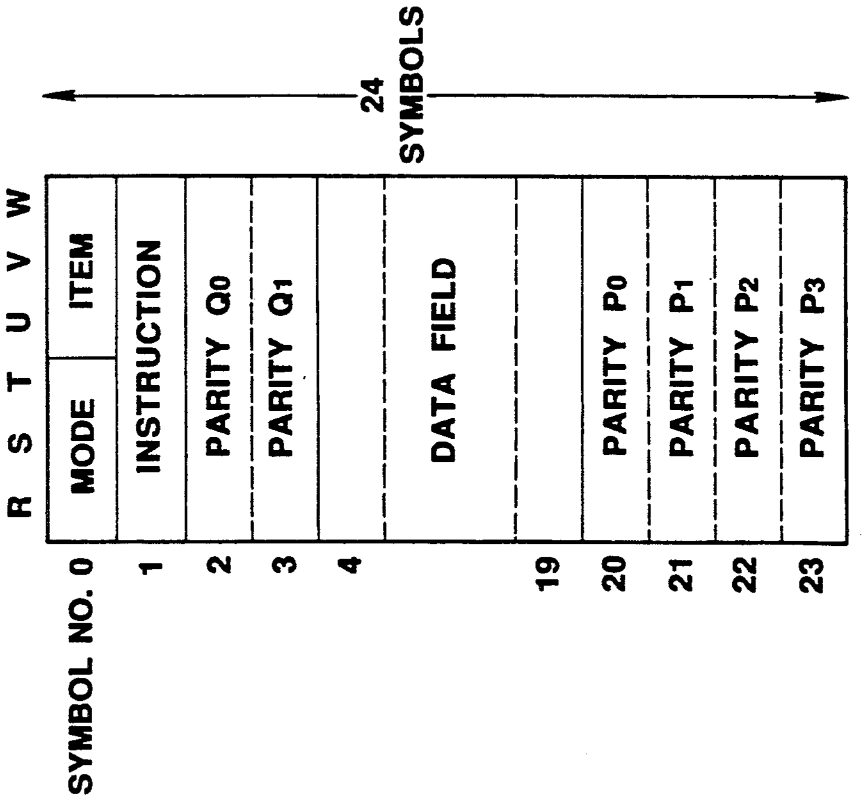
FIG. 8 is a diagram of a pack format of the compact disc (105) made by subcodes R through W.

FIG. 8 illustrates a general data format for each pack (24 symbols). With regard to R to W of the 0-th to 23rd symbols, the upper three bits of the 0-th symbol is called "mode," which generally classifies what this pack data indicates, and the lower three bits are called "item," which indicates the details of the pack data. The first symbol is an "instruction" to indicate hardware operational information of a decoder, and the fourth to 19th symbols are a data field where data is input. An error correction code is added for each pack; parities $Q_0$ and $Q_1$ are added to the second and third symbols and parities $P_0$ to $P_3$ are added to the 20th to 23rd symbols. The parities $Q_0$ and $Q_1$ are a Reed-Solomon code of (4, 2) of GF ($2^6$) for the 0th to third symbols, and the parities $P_0$ to $P_3$ are a Reed-Solomon code of (24, 20) of GF ($2^6$) for the 0th to 23rd symbols.

As is obvious from this structure, in recording the subcode part 302 (FIG. 3) on a CD, an error correction code is added to the user's bits R to W for each pack, and the same interleaving process as is done in the case of the audio data 303 and 305 (see FIG. 3) is executed for each pack. In reproducing a signal recorded on the CD 105 in FIG. 1 in the above manner, first, the demodulator 108 in FIG. 1 demodulates an EFM-modulated signal and identifies the frame structure shown in FIG. 3. Then, the subcode 302 of the frame is extracted and is sent to the subcode signal processor 110 in FIG. 1. The processor 110 performs de-interleaving and error correction using the parities $Q_0$, $Q_1$ and $P_0$ to $P_3$ shown in FIG. 6 for each pack to thereby extract the user's bits R to W of each of the fourth to 19th symbols of each pack.

The format described above referring to FIGS. 3 to 8 has already been standardized, and presently available CDs are manufactured based on this standard.

Figure 9:
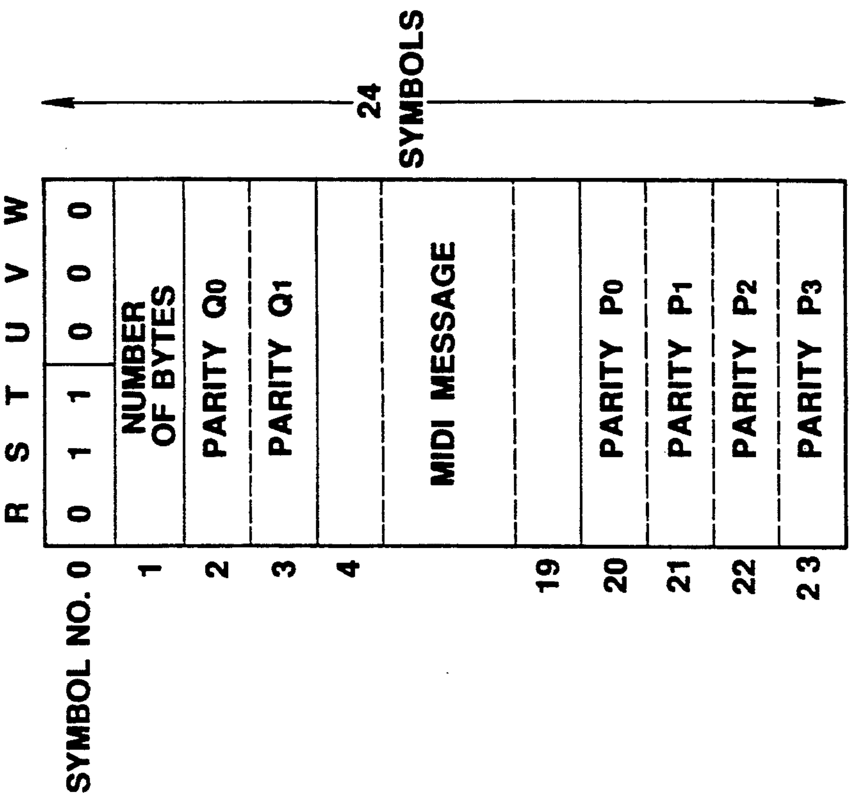
FIG. 9 is a diagram of a pack format of the compact disc (105A, 105B) in CD-MIDI mode.

According to this embodiment, the pack format described referring to FIG. 8 is used to record MIDI data. Its practical format is shown in FIG. 9. As illustrated, the "mode" and "item" of the 0th symbol are set to "011000," which indicates that a MIDI message is recorded in the data field in the pack format. As the "instruction" (first symbol), data representing the number of bytes in the data field is recorded.

Figure 10:
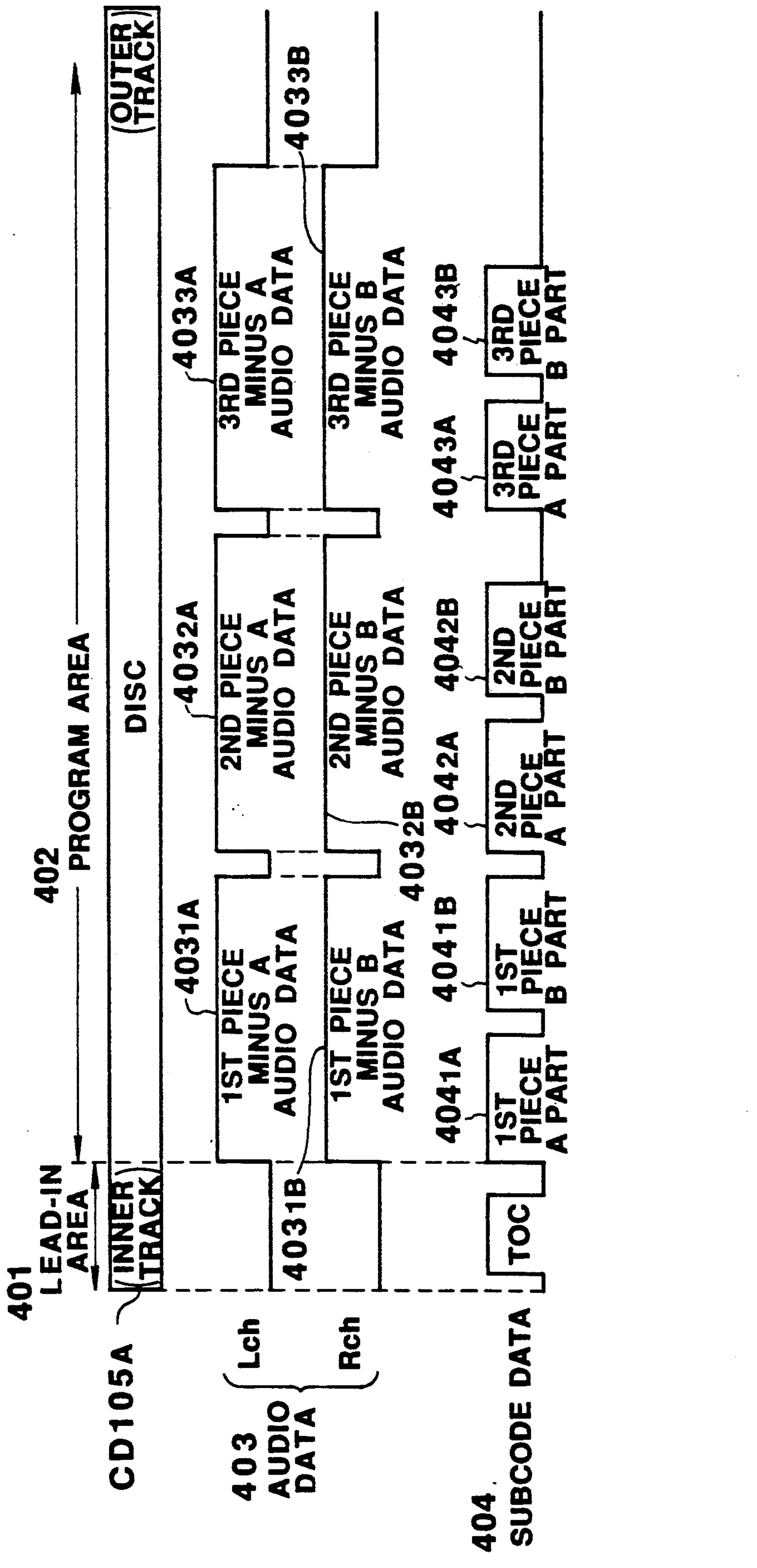
FIG. 10 is a diagram illustrating the recorded contents of the compact disc (105A) in the first embodiment.

FIG. 10 is a diagram conceptually illustrating how audio data and auto-play music data used in this embodiment are recorded on the customized CD 105A.

The individual pieces of data described earlier referring to FIG. 3 are recorded in the units of frames on the customized CD 105A outward from the inner track.

In a lead-in area 401, the innermost track of the disc, TOC data corresponding to the tables of contents for a single disc is recorded as a subcode in the format shown in FIG. 5.

Following this lead-in area 401 is a program area 402 in which music data for three pieces of music, for example, is recorded as audio data 403 which is main data in the data recorded in the unit of frame shown in FIG. 3; the audio data 403 is recorded in the format of the data 303 and 305 in FIG. 3. For ordinary CDs, audio data can be recorded in stereo with the L and R channels. In this embodiment, audio data $\mathbf{403}_{1A}$–$\mathbf{403}_{3A}$ and $\mathbf{403}_{1B}$–$\mathbf{403}_{3B}$ are recorded independently for the L and R channels, and musical tones are output at the time of sound reproduction, with either the L or R channel being selected. For instance, the audio data $\mathbf{403}_{1A}$ of that music played by an orchestra excluding a piano part is recorded in the L channel of the first piece of music. This audio data is called minus A audio data where "A" indicates piano. Likewise, the audio data $\mathbf{403}_{1B}$ of the orchestra-played music excluding a violin part is recorded in the R channel of the first piece of music. This audio data is called minus B audio data where "B" indicates violin. Such audio data for plural pieces of music, namely, three pairs of audio data, $\mathbf{403}_{1A}$ and $\mathbf{403}_{1B}$, $\mathbf{403}_{2A}$ and $\mathbf{403}_{2B}$, and $\mathbf{403}_{3A}$ and $\mathbf{403}_{3B}$. in this embodiment, are recorded.

Further, auto-play music data $\mathbf{404}_{1A}$, $\mathbf{404}_{2A}$ and $\mathbf{404}_{3A}$ for three pieces of music of the A part (piano) that is excluded from the audio data of the L channel and auto-play music data $\mathbf{404}_{1B}$, $\mathbf{404}_{2B}$ and $\mathbf{404}_{3B}$ for three pieces of music of the B part (violin) that is excluded from the audio data of the R channel are recorded as subcode data 404 (which is recorded in the format of the data 302 in FIG. 3) in the data recorded in the unit of frame shown in FIG. 3. These auto-play music data are read out to be auto-played by the electronic keyboard musical instrument section 200 in FIG. 1.

With reference to FIG. 11, the TOC data will be described again. As should be obvious from this diagram, the TOC data recorded as the subcode data 404 of the lead-in area 401 shown in FIG. 10 includes the absolute time data from the starting points of the individual pieces of audio data $\mathbf{403}_{1A}$–$\mathbf{403}_{3A}$ and $\mathbf{403}_{1B}$–$\mathbf{403}_{3B}$ and those of auto-play music data $\mathbf{404}_{1A}$–$\mathbf{404}_{3A}$ and $\mathbf{404}_{1B}$–$\mathbf{404}_{3B}$, all recorded in the program are 402 shown in FIG. 10. As the absolute times (see FIG. 5) are consecutively recorded at the respective positions in the program area 402 outward from the inner track, the starting points of the individual pieces of the audio data and auto-play music data can be determined by checking the absolute time data from the starting points. The TOC data is actually recorded in the format shown in FIG. 5. In this case, this recording is done with the "point" being also set for each auto-play music data of the subcode. In accessing each piece of data on the disk, the CD controller 102 in FIG. 1 first refers to the TOC data so that arbitrary data including the auto-play music data recorded as the subcode in the program area can be accessed. Since each piece of audio data and auto-play music data can be managed by the TOC data, the audio data for the individual pieces of music can be recorded irrespective of their order in the audio data areas (303 and 305 in FIG. 3). So can the auto-play music data for the individual pieces of music in the subcode data area (302 in FIG. 3), irrespective of their order and without requiring synchronization with the associated audio data.

FIG. 12 illustrates MIDI messages used in this embodiment. MIDI messages conforming to the MIDI standard each are constituted of a combination of a plurality of bytes each consisting of eight bits. Each MIDI message consists of status bytes indicating the type of the message and data bytes for its data.

In this embodiment, a note ON message 501, a note OFF message 502 and a program change message 503 are used as voice messages.

The note ON message 501 for an electronic keyboard instrument is a command corresponding to pressing of a key on the keyboard (202-1 in FIG. 2); the status is "9×" (expressed in hexadecimal notation: × indicates a MIDI channel), the first byte data 1 is a note number $501_1$ and the second byte data 2 is a velocity $501_2$. At the time of guide-playing, when the instrument controller 201 in FIG. 1 reads out the message 501 from the auto-play memory 212, this controller instructs the guide lamp driver 214 to light the LED 202-3 (FIG. 2) located above the key 202-2 associated with the note number $501_1$ of the message. At the time of auto-playing, when the instrument controller 201 reads out the message 501, this controller sets the note number $501_1$ of this message as pitch data in the scale controller 204. As a result, the wave memory 203 is accessed and reading of the associated wave data starts, as described above. The instrument controller 201 outputs a note ON signal and the velocity $501_2$ of the message 501 to the note ON/OFF controller 207. In turn, the controller 207 controls the envelope controller 206 to add an envelope to wave data output from the wave memory 203, and tone generation starts.

The note OFF message 502 in FIG. 12 for an electronic keyboard instrument is a command corresponding to releasing of a key on the keyboard (202-1 in FIG. 2); the status is "8×," the first byte data 1 is a note number $502_1$ and the second byte data 2 is a OFF velocity $502_2$. At the time of guide-playing, when the instrument controller 201 in FIG. 1 reads out the message 502 from the auto-play memory 212, this controller instructs the guide lamp driver 214 to turn off the LED 202-3 (FIG. 2) located above the key 202-2 associated with the note number $502_1$ of this message. At the time of auto-playing, when the instrument controller 201 reads out the message 502, this controller 201 outputs a note OFF signal and the OFF velocity $502_2$ of the message 502 to the note ON/OFF controller 207. In turn, the controller 207 controls the envelope controller 206 to add an envelope to wave data output from the wave memory 203, and a tone OFF operation starts, as described above. At the timing when the amplitude of a musical tone becomes 0, the instrument controller 201 causes the scale controller 204 to erase the note number $502_4$ of the message. Accordingly, reading out the associated wave data from the wave memory 203 stops.

The program change corresponds to pressing of the timbre designation key (202-11 in FIG. 2); the status is "CX," the first byte data 1 of the program change is a program number. At the time of guide-playing or auto-playing, when the instrument controller 201 in FIG. 1 reads out the message 503 from the auto-play memory 212, this controller 201 outputs the program number $503_1$ to the timbre controller 205. In turn, the timbre controller 205 sets the head address of the memory area in the wave memory 203 where the wave data of the timbre corresponding to this program number in the first address (not particularly shown) in the memory 203. Therefore, a player can perform a manual play with that timbre at the time of guide-playing, and auto-playing can be done with the timbre at the time of auto-playing.

According to this embodiment, a special command is assigned as an exclusive message for CD-MIDI. The exclusive message is originally a message exclusive for a maker who has registered an ID code; however, a new ID for the CD-MIDI is set as the ID code to define a tone length control command. More specifically, the tone length control command has a structure as shown in FIG. 12 which includes several bytes of data consisting of "ID for CD-MIDI $504_1$," "tone length control command code $504_2$" and "tone length data $504_3$" located between the status "F0" and the end-of-exclusive (EOX) "F7." At the time of guide-playing or auto-playing, when the instrument controller 201 in FIG. 1 reads out the tone length control command 504 from the auto-play memory 212, this controller 201 sends the tone length data $504_3$ to the timer circuit 213. Upon detection of the elapse of the time corresponding to the tone length data $504_3$, the timer circuit 213 outputs a coincidence signal to the instrument controller 201. As a result, the instrument controller 201 reads out the note OFF message, stored as the next data in principle in the auto-play memory 212, and executes the above-described note OFF operation. The above is an example of a monophonic; in the case of a polyphonic, a note number needs to be included in the tone length control command 504 and the tone length of the note number should be controlled.

Figure 13:
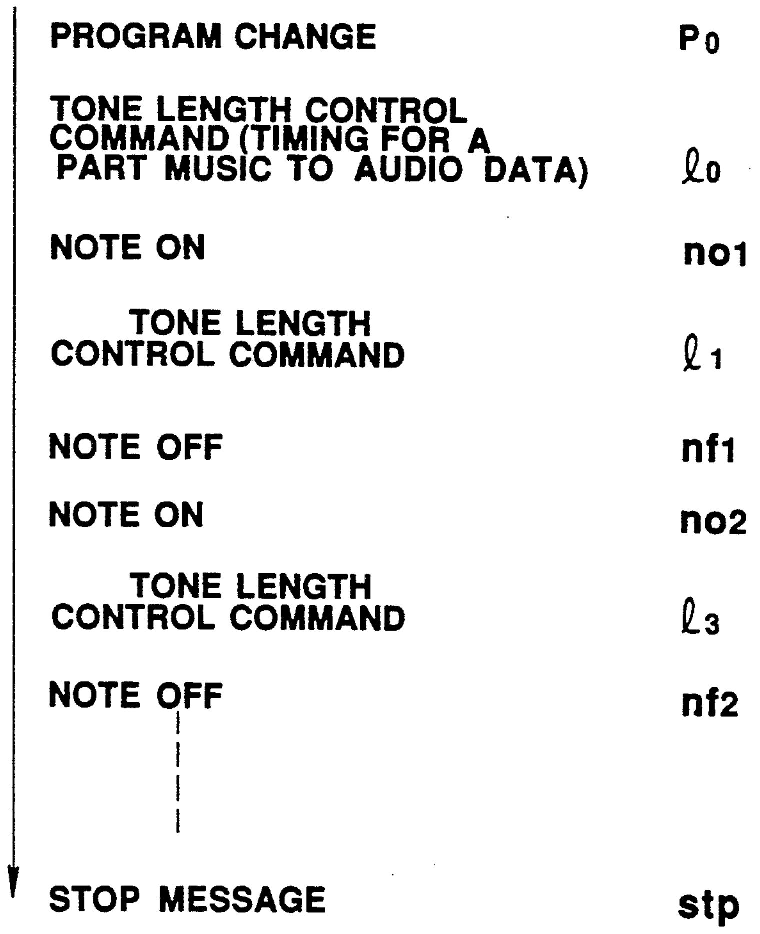
FIG. 13 is a diagram exemplifying auto-play data in the first embodiment.

FIG. 13 illustrates an example of auto-play music data (corresponding to $404_{1A}$ in FIG. 10) for one piece of music, which consists of the aforementioned MIDI message for a CD and is recorded in the subcode 404 on the customized CD 105A.

A program change $P_0$ (corresponding to 503 in FIG. 12) is located at the head of the auto-play music data. At the time of guide playing or auto-playing, this message is read out from the customized CD 105A (FIG. 1) based on a control operation to be described later, and is sent from the subcode signal processor 110 to the instrument controller 201. In turn, the controller 201 sends the program number (see $503_1$ in FIG. 12) to the timbre controller 205 which designates a predetermined area in the wave memory 203 to specify the waveform of the associated timbre.

Following the program change are data for activating the LED 202-3 (FIG. 2) based on the guide-playing or data for auto-playing. These pieces of data are transferred to the auto-play memory 212 via the instrument controller 201 from the subcode signal processor 110 at the time of guide-playing or auto-playing, as will be described later. Then, the instrument controller 212 performs the guide-play or auto-play while reading out the auto-play music data from the auto-play memory 212 piece by piece.

The first tone length control command $l_0$ is issued to match the timing. For instance, a piano part in an orchestra-played music may not always start from the beginning of the music, in which case reproduction of the minus-A audio data (for example, $\mathbf{403}_{1A}$ in FIG. 10) should be synchronized with the guide-playing or auto-playing based on the auto-play music data (for example, $\mathbf{404}_{1A}$ in FIG. 10) stored in the auto-play memory 212. The tone length control command $l_0$ is used to count the time required for the beginning of the piano part. In reading out auto-play music data from the auto-play memory 212 in FIG. 1, since this command $l_0$ is stored at the head of the data, generation of a musical tone has not yet started. When the time corresponding to the tone length data (see $\mathbf{504}_3$ in FIG. 12) of this command is detected by the timer circuit 213, the next note ON message $no_1$ is read out. Even if the piano part starts from a middle part of the music, therefore, it can surely be synchronized with a reproduced sound of the audio data. If the piano part starts from the beginning of the music, this tone length control command $l_0$ at the head of the auto-play music data is not necessary. The above operation can also apply to orchestra-played music based on the minus-B audio data $\mathbf{403}_{1B}$ and the guide-playing or auto-playing of, for example, a violin part based on the auto-play music data $\mathbf{404}_{1B}$.

Following the tone length control command l are sets of a note ON message, a tone length control command and a note OFF message, namely, $no_1$, $l_1$ and $nf_1$, and $no_2$, $l_2$ and $nf_2$, and so forth in FIG. 13. The instrument controller 201 in FIG. 1 controls the guide-playing or auto-playing in the above-described manner based on these pieces of control data.

At the end of the part, a stop message step is read out, which causes the instrument controller 201 to return to the normal mode from the guide-playing mode or auto-playing mode.

Key-invoked Operation

FIGS. 14 through 19 present flowcharts of the operations executed when the individual keys (FIG. 2) of the instrument operating section 202 in FIG. 1 are operated. These operational flows are carried out cooperatively by the instrument controller 201, CD controller 102, subcode signal processor 110, audio data signal processor 109, etc. Examples of key operations are illustrated in FIG. 20. The following will describe each key operation; the operational flowcharts shown in FIGS. 14 to 19 are executed as part (subroutines) of the main operational flowchart (not particularly shown) which is performed by the instrument controller 201 or CD controller 102 in FIG. 1.

First, when the customized CD 105A is set on the CD player section 100 in FIG. 1, this event is detected by a disc-set detecting microswitch or the like (not shown) and a detection signal therefrom is input to the CD controller 102. In turn, the CD controller 102 controls the disc motor driver 103 to drive the disc motor 106. Only the TOC part of the lead-in area (see 401 in FIG. 10) at the innermost track on the customized CD 105A is read out by the optical pickup 107, and the TOC data is extracted by the subcode signal processor 110 and is stored in the TOC memory 101 via the CD controller 102 as a table for accessing to the starting point of a piece of music. The above operation is illustrated by a step $S_1$ in the operational flowchart shown in FIG. 14.

A description will now be given of a case where the key operation shown in FIG. 20(*a*) is executed; this key operation is for carrying out the guide-playing.

In this case, when the instrument controller 201 detects depression of the key "1" in the music designation keys 202-6, depression of the part designation key 202-4 indicating the A part (piano part), then depression of the data read key 202-7, instruction data to read the auto-play music data for the A part of the first piece of music is sent to the CD controller 102.

Figure 15:
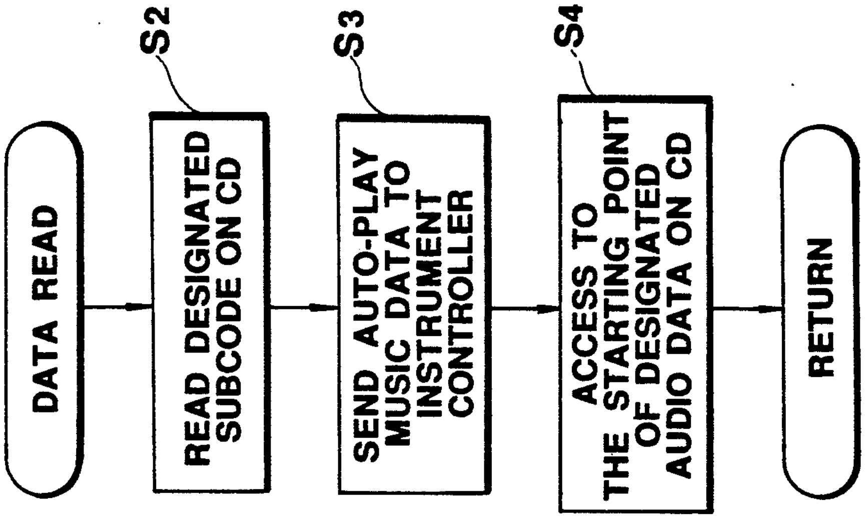
FIG. 15 is a flowchart illustrating an operation at the time of reading auto-play data in the first embodiment.
Figure 14:
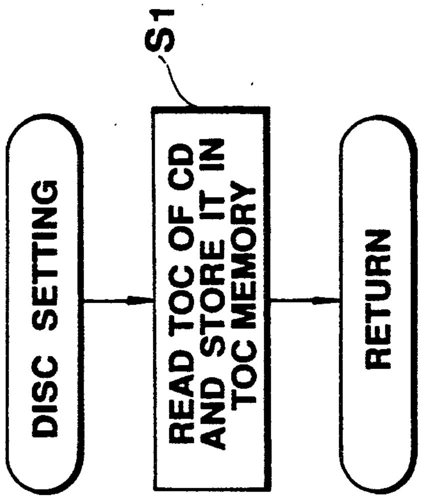
FIG. 14 is a flowchart illustrating an operation at the time of setting a disc in the first embodiment.

Upon reception of the instruction data, the CD controller 102 executes the operational flowchart shown in FIG. 15.

To begin with, in step $S_2$, the absolute time data from the starting point of the subcode of the A part of the first piece of music is read out as TOC data from the TOC memory 101 in which data contents as shown in FIG. 11 are stored. Subsequently, the pickup driver 104 is controlled to move the optical pickup 107 to the position of the absolute time data from the starting point, thereby permitting the optical pickup to access to the starting point of the A part. As a result, the auto-play music data $\mathbf{404}_{1A}$ for the A part of the first piece of music recorded on the CD 105 in the manner shown in FIG. 8 is read out by the optical pickup 107 and is sent through the demodulator 108 to the subcode signal processor 110.

In the subsequent step $S_3$, this auto-play music data $\mathbf{404}_{1A}$ is sent to the instrument controller 201 from the subcode signal processor 110.

In addition to the above operation, the CD controller 102 again accesses to the TOC data stored in the TOC memory 101 to read out the data of the absolute time from the starting point of the minus-A audio data of the first piece of music in step $S_4$. As a result, the pickup driver 104 is controlled and the optical pickup 107 is moved to the position of the absolute time data from the starting point to permit access to the starting point of the minus-A audio data $\mathbf{403}_{1A}$ of the first piece of music which is recorded as shown in FIG. 10. The minus-A audio data $\mathbf{403}_{1A}$ therefore becomes ready to be instantaneously reproducible (pause status).

Figure 16:
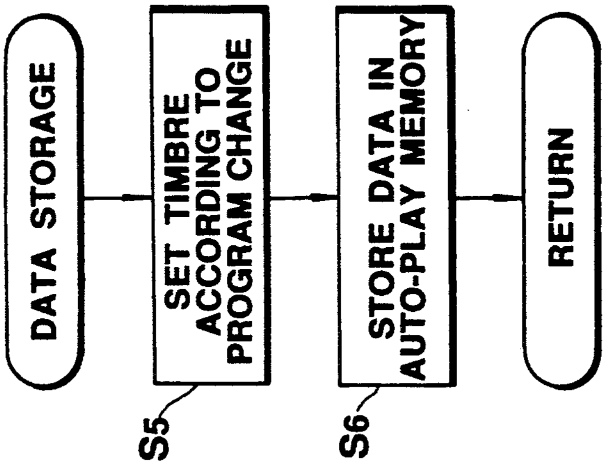
FIG. 16 is a flowchart illustrating an operation at the time of storing auto-play data in the first embodiment.

The instrument controller 201 in FIG. 1 performs the operational flow shown in FIG. 16 on the auto-play music data $\mathbf{404}_{1A}$ output from the subcode signal processor 110 in the above manner.

Of the auto-play music data sequentially sent in the form shown in FIG. 13, the first piece of data or the program change message $p_0$ is executed, and the timbre for the A part of the first piece of music, e.g., the piano timbre, is designated in the manner described above.

In the next step $S_6$, a sequence of data following the program change message $p_0$ is stored in the auto-play memory 212 in FIG. 1. This sets the electronic keyboard instrument section 200 ready for the guide-playing.

Figure 17:
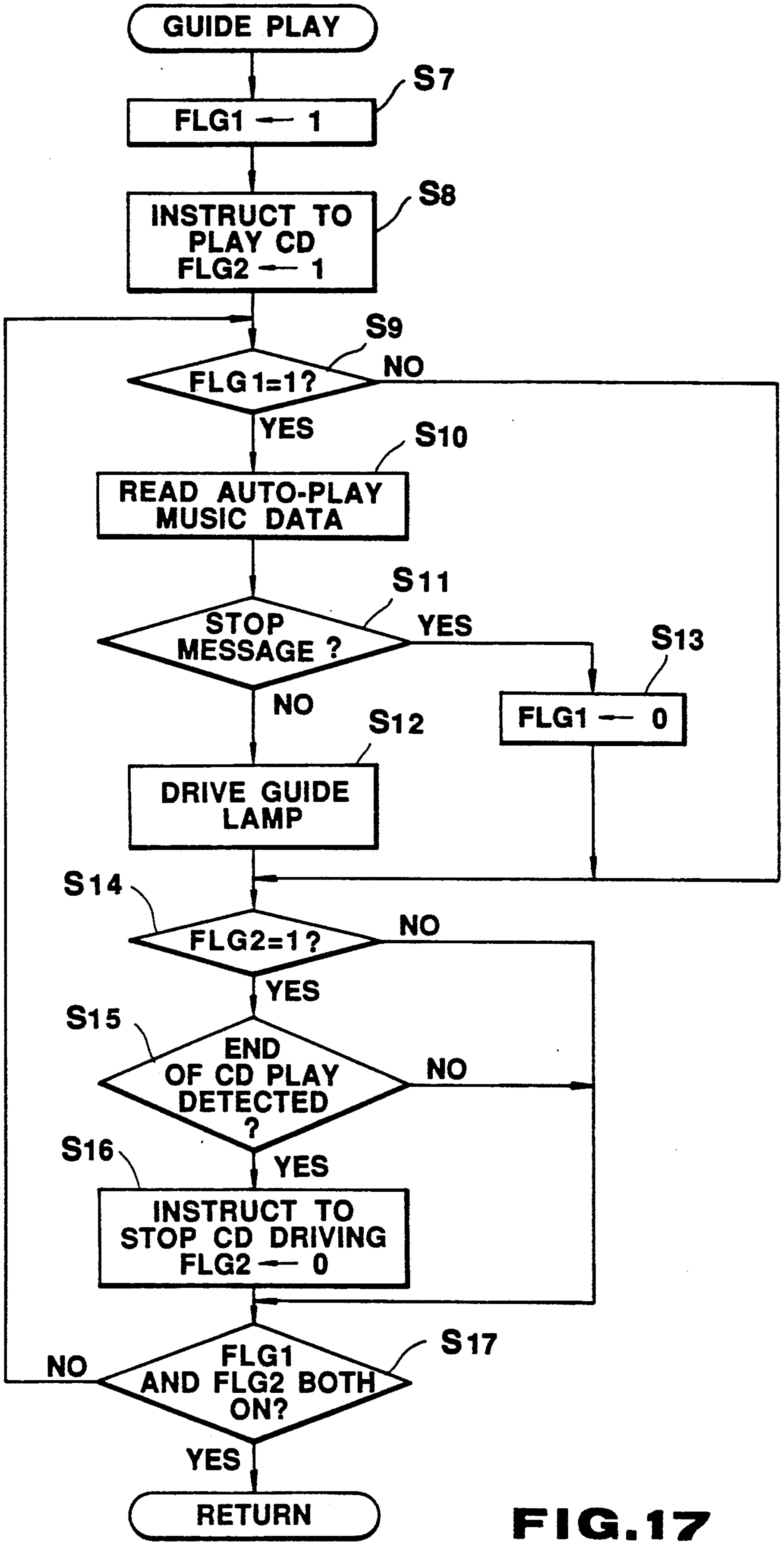
FIG. 17 is a flowchart illustrating an operation at the time of guide-playing in the first embodiment.

Then, the instrument controller 201 executes the operational flow shown in FIG. 17 upon detection of depression of the guide start key 202-3 in FIG. 2 to instruct the guide-playing.

A flag FLG1 indicating auto-playing in progress is set to "1" in step $S_7$.

In step $S_8$, a CD play instruction is given to the CD controller 102 in FIG. 1 while a flag FLG2 indicating CD reproduction in progress is set to "1." In response to this instruction, the CD controller 102 release the pause status of the CD to start playing the minus-A audio data $403_{1A}$ (see FIG. 10) of the first piece of music at the starting point of which the optical pickup 107 has been positioned in advance in the aforementioned step $S_4$ (FIG. 15).

As the FLG1 is "1," the decision in the subsequent step $S_9$ becomes YES (a case of NO will be described later) and the flow advances to step $S_{10}$ where auto-play music data following the tone length control command $l_0$ is sequentially read out from the auto-play memory 212.

If the read-out auto-play music data is not the stop message (stp in FIG. 13), the decision in step $S_{11}$ becomes NO (a case of YES will be described later) and the flow advances to step $S_{12}$ where guide-playing for the part A (piano part) of the first piece of music is performed as described earlier.

As the FLG2 is "1," the decision in the subsequent step $S_{14}$ becomes YES (a case of NO will be described later) and the flow advances to step $S_{15}$. In this step, it is discriminated whether or not a signal from the CD controller 102 (FIG. 1) which indicates the end of reproduction of the minus-A audio data of the first piece of music is detected. As this decision initially is NO, the flow advances to step $S_{17}$.

In step $S_{17}$, it is discriminated whether or not the FLG1 and FLG2 are both 0, i.e., whether or not the guide-playing and CD reproduction have both ended. As this decision initially is NO, the flow returns to step $S_9$ to repeat the sequence of steps S10–S12.

When the stop message stp (FIG. 13) is read out from the auto-play memory 212 (FIG. 1) in step $S_{10}$, the decision in step $S_{11}$ becomes YES, and the flag FLG1 is reset to "0" in the subsequent step $S_{13}$ to end the auto-playing. In this case, if reproduction of audio data by the CD player section 100 in FIG. 1 has not been completed, the decision in step $S_9$ becomes NO thereafter, and the loop $S_{14} \rightarrow S_{15} \rightarrow S_{17} \rightarrow S_9 \rightarrow S_{14}$ is repeated to execute only the CD reproduction. When the signal from the CD controller 102 (FIG. 1) which indicates the end of reproduction of the minus-A audio data of the first piece of music is detected, the decision in step $S_{15}$ becomes YES. Consequently, a signal which instructs to stop driving the CD is output to the CD controller 102 in FIG. 1 and the flag FLG2 is reset to "0" in step $S_{16}$. As a result, the CD controller 102 controls the disc motor driver 103 to stop driving the disc motor 106, thereby terminating the CD reproduction. Subsequently, the FLG1 and FLG2 both become "0," so that the decision in step $S_{17}$ becomes YES and control for the guide-playing and CD reproduction is terminated.

When the signal from the CD controller 102 (FIG. 1) which indicates the end of reproduction of the minus-A audio data of the first piece of music is detected before the stop message stp (FIG. 11) is read out from the auto-play memory 212 (FIG. 1), the CD driving instruction is issued and the FLG2 is reset to "0" in step $S_{16}$ before the FLG1 is reset to "0." Therefore, the decision in step $S_{14}$ becomes NO thereafter, and the loop $S_{17} \rightarrow S_9 \rightarrow S_{10} \rightarrow S_{11} \rightarrow S_{12} \rightarrow S_{14} \rightarrow S_{17}$ is repeated to execute only the guide-playing. When the stop message stp is read out in step $S_{10}$, the FLG1 is reset to "0" in step $S_{13}$ and the flow advances to step $S_{17}$ from $S_{14}$. Then, the decision in step $S_{17}$ becomes YES and control for the guide-playing and CD reproduction is terminated.

Figure 20A:
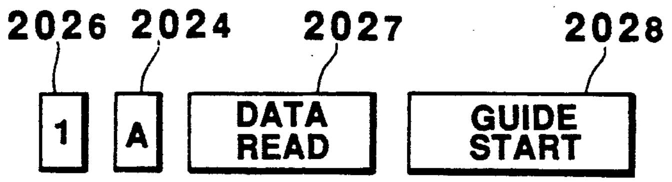
FIGS. 20(*a*) through 20(*c*) are diagrams exemplifying key operations in the first embodiment.
Figure 20B:
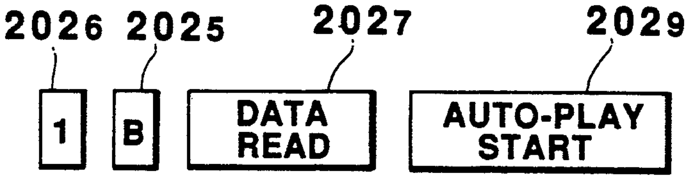
Figure 20C:
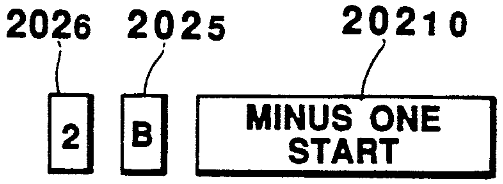

As a player performs the key operation shown in FIG. 20A, the minus-A audio data of the first piece of music is reproduced by the CD player section 100 (FIG. 1) and, at the same time, the guide-playing is executed in synchronism with the audio data reproduction by means of the LEDs 202-3 located above the associated keys 202-2 (see FIG. 2) in the instrument operating section 202 (FIG. 1), in the manner described above. As the player plays the music by operating the keys 202-2 as indicated by the associated LEDs 202-3, the player would feel as if he is playing the first piece of music with orchestra-played music based on the minus-A audio data of the first piece of music in the background.

A description will now be given of a case where the key operation shown in FIG. 20(*b*) is executed; this key operation is for carrying out the auto-playing.

In this case, when the instrument controller 201 (FIG. 1) detects depression of the key "1" in the music designation keys 202-6, depression of the part designation key 202-5 indicating the B part (violin part), then depression of the data read key 202-7, instruction data to read the auto-play music data for the B part of the first piece of music is sent to the CD controller 102 (FIG. 1).

Upon reception of the instruction data, the CD controller 102 executes the operational flowchart shown in FIG. 15. Through the same operation as described previously, the auto-play music data $404_{1B}$ of the B part of the first piece of music shown in FIG. 10 is read out and is output to the instrument controller 201 from the subcode signal processor 110, while the CD controller 102 accesses to the starting point of the minus-B audio data $403_{1B}$ of the first piece of music recorded as shown in FIG. 10. As a result, the audio data 403 1B is ready to be instantaneously reproducible.

Upon reception of the auto-play music data $404_{1B}$ from the subcode signal processor 110, the instrument controller 201 executes the operational flow shown in FIG. 16 and records this data in the auto-play memory 213 as described above. This sets the electronic keyboard instrument section 200 ready for auto-playing.

Figure 18:
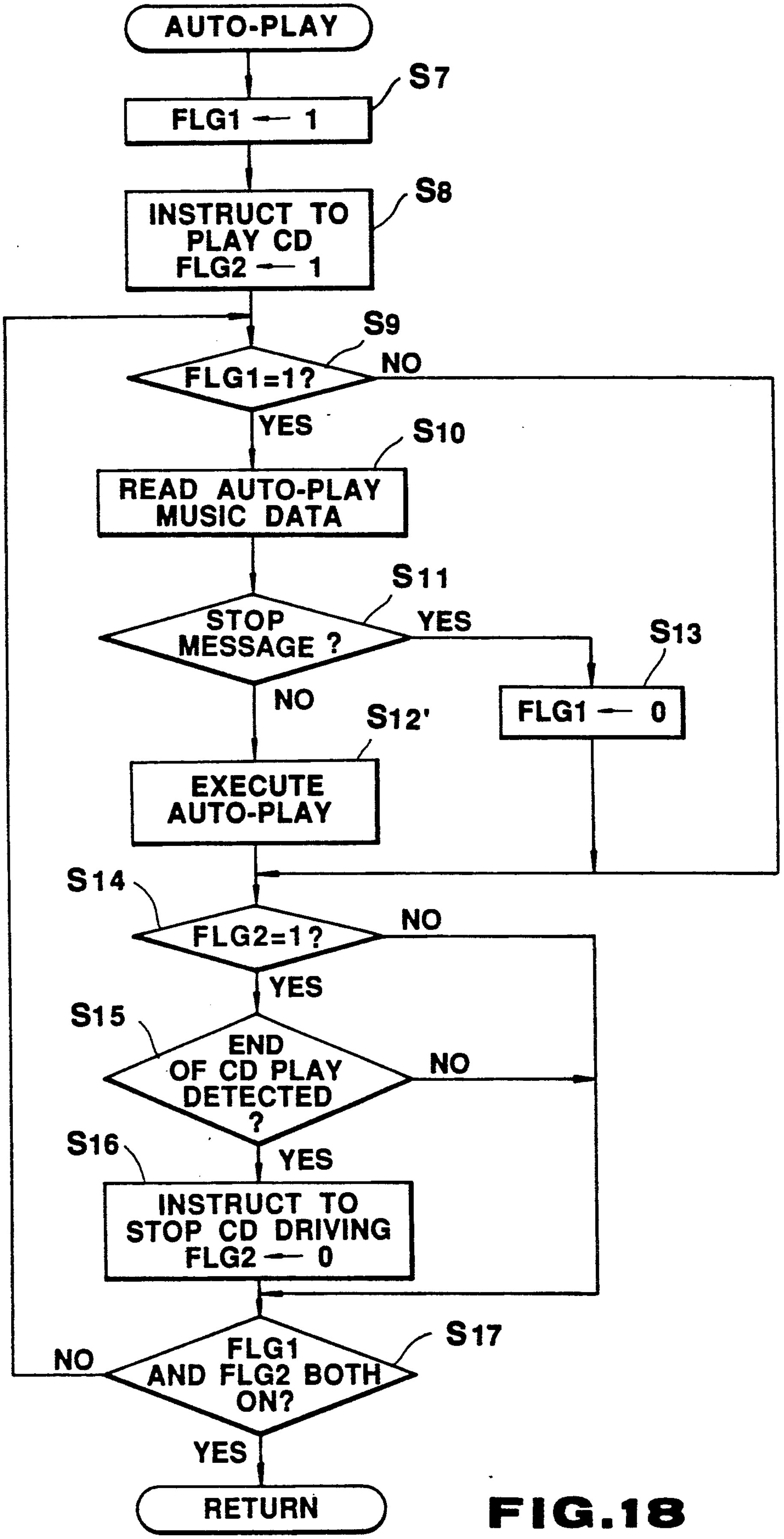
FIG. 18 is a flowchart illustrating an operation at the time of auto-playing in the first embodiment.
Figure 19:
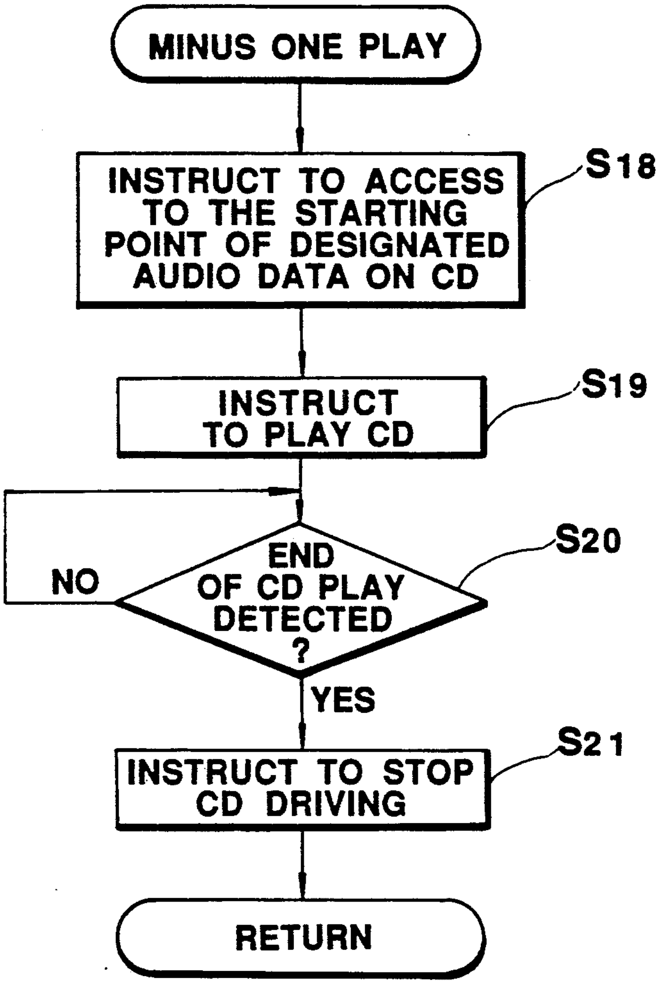
FIG. 19 is a flowchart illustrating an operation at the time of playing a compact disc in the first embodiment.

Then, the instrument controller 201 executes the operational flow shown in FIG. 18 upon detection of depression of the auto-play start key 202-9 in FIG. 2 to instruct the auto-playing. This operational flow is the same as that shown in FIG. 17 except that the guide-playing process of step $S_{12}$ in the flowchart in FIG. 17 is replaced with an auto-playing process of $S_{12'}$.

As the player performs the key operation shown in FIG. 20(*b*), the CD player section 100 (FIG. 1) reproduces the minus-B audio data of the first piece of music while the electronic keyboard instrument section 200 performs the auto-playing of the B part (violin part) of the first piece of music in synchronism with the audio data reproduction. Accordingly, the player would feel as if auto-playing is performed with orchestra-played music based on the minus-B audio data of the first piece of music in the background.

A description will now be given of a case where the key operation shown in FIG. 20(*c*) is executed. Through this key operation, only the reproduction of the minus-B audio data $403_{2B}$ (see FIG. 10) of the second piece of music recorded on the CD 105 (FIG. 1) is carried out, and neither the guide-playing nor the auto-playing is performed. Therefore, no auto-play music data of the subcode is not read out.

In this case, the instrument controller 201 (FIG. 1) executes the operational flowchart shown in FIG. 17.

First, when the instrument controller 201 detects depression of the key "2" in the music designation keys 202-6 (FIG. 2), depression of the part designation key 202-5 indicating the B part (violin part), then depression of the minus-one start key 202-10, instruction data to cause the CD player section 100 to play the minus-B audio data of the second piece of music is sent to the CD controller 102 (FIG. 1). The above process is executed in step $S_{18}$ in FIG. 19. In response to the process in step $S_{18}$, the CD controller 102 accesses to the TOC data (FIG. 11) in the TOC memory 101 and reads out the head frame number of the minus-B audio data of the second piece of music. As a result, the pickup driver 104 is controlled and the optical pickup 107 is moved to the position of the head frame to permit access to the starting point of the minus-B audio data $403_{2B}$ of the second piece of music which is recorded as shown in FIG. 10. The minus-B audio data $403_{2B}$ therefore becomes ready to be instantaneously reproducible.

In step $S_{19}$, a CD play instruction is given to the CD controller 102 in FIG. 1. In response to this instruction, the CD controller 102 starts the reproduction of the minus-B audio data $403_{2B}$ (see FIG. 10) of the second piece of music at the starting point of which the optical pickup 107 has been positioned in advance in the aforementioned step $S_{18}$.

In the next step $S_{20}$, the present apparatus becomes ready to detect a signal from the CD controller 102 that indicates the end of reproduction of the minus-B audio data of the second piece of music.

Upon detection of the reproduction end signal from the CD controller 102, the decision in step $S_{20}$ becomes YES. As a result, a signal for instructing to stop driving the CD is output to the CD controller 102, which in turn controls the disc motor driver 103 to stop the disc motor 106, thus terminating the CD reproduction.

Through the above reproduction operation, the player plays the music by operating the keys 202-2 on the keyboard 202-1 (FIG. 2) of the instrument operating section 202 in FIG. 1 with the CD reproduced sounds on the background. In this case, by operating the timbre designation keys 202-11 to set the timbre corresponding to the part B (violin part), for example, the player would feel as if he is playing the music with a full orchestra in the background.

Modifications of First Embodiment

Although wave data of various types of musical tones are stored in advance in a digital-coded form by the PCM system into the wave memory 203 and the electronic keyboard instrument section 200 serves as a PCM tone generator in the first embodiment shown in FIGS. 1 through 20, this embodiment is not limited to this design but may employ various types of tone wave generating devices, such as a wave modulated type, a harmonics synthesis type, and a harmonics subtracting type.

The tone length control command shown in FIG. 12 is recorded on a CD using an exclusive message that conforms to the MIDI standard. In this case, an ID for CD-MIDI is newly set for the ID part. Alternatively, an identification flag for CD-MIDI may be added after the existing ID for a maker, followed by a tone length control command.

Further, musical tone data for a single musical tone is constituted of a note ON message, a tone length control command and a note OFF message as one set. Alternatively, the tone length control command may be used simply as a command to control the reading time. That is, the voice messages (see FIG. 12) and the time control commands are alternately arranged. After a voice message is read out first, generation of the associated musical tone is controlled and the next time control command is read out at the same time. When the time corresponding to this time control command elapses, the next voice message is read out, and the above is repeated. This is one modification of the status of the tone length control command in use, and such a structure of auto-play data is within the scope of the present invention. This data structure may be applied to the second embodiment of the present invention, which will be described shortly.

Reproduction of a piece of music from a CD and reproduction of auto-play music data can start at the same time in the first embodiment by making the tone length control command $l_0$ (see FIG. 13) located at the beginning of the auto-play data to indicate the time zero or eliminating this tone length control command.

Although auto-play music data and audio data which is to be reproduced in synchronism therewith are recorded on a CD and are reproduced by a CD apparatus in the first embodiment, the recording medium is not limited to a CD but may be a DAT (digital audio tape) as long as these two types of data can be recorded on it.

Audio data of different minus-one parts (minus A, minus B, etc.) and auto-play music data for the parts are recorded in the L channel and R channel. The data of the individual parts may be recorded at different time positions, not in the L and R channels.

Further, the auto-play music data may be recorded in the CD-ROM recording format at different time positions in the audio data recording area, not the subcode area. In this case, audio data of the minus-one part is also recorded in the CD-ROM recording format.

Second Embodiment

The second embodiment of the present invention will be described below referring to FIGS. 21 through 26. The same reference numerals as used for the first embodiment will be used to denote the corresponding or identical elements.

Recorded on a customized CD 105B used in the second embodiment are a musical portion of a specific part (e.g., a melody part by a piano) of a certain piece of music as audio data, a sound effect suitable for that music (e.g., sounds of waves), and a specific instrument sound used as timbre data of an electronic musical instrument. Auto-play data for the same music excluding the mentioned specific part is recorded as a subcode of the CD.

By playing the CD having such data recorded thereon, the auto-play data recorded as the subcode is read out from the CD and is temporarily stored in an auto-play memory. The auto-play data stored in this auto-play memory is sequentially read out and auto-playing is executed in accordance with the auto-play data. At the same time, the specific part and sound effect are reproduced with the CD being played in synchronism with the auto-playing. This can permit reproduction of audio data from the CD and auto-playing in ensemble.

Prior to the auto-playing, the specific instrument sound recorded in advance on the CD is reproduced and is sampled, and the sampled sound is stored as timbre data in the wave memory. The auto-playing is then executed with the timbre data stored in this wave memory.

General Arrangement

Figure 21:
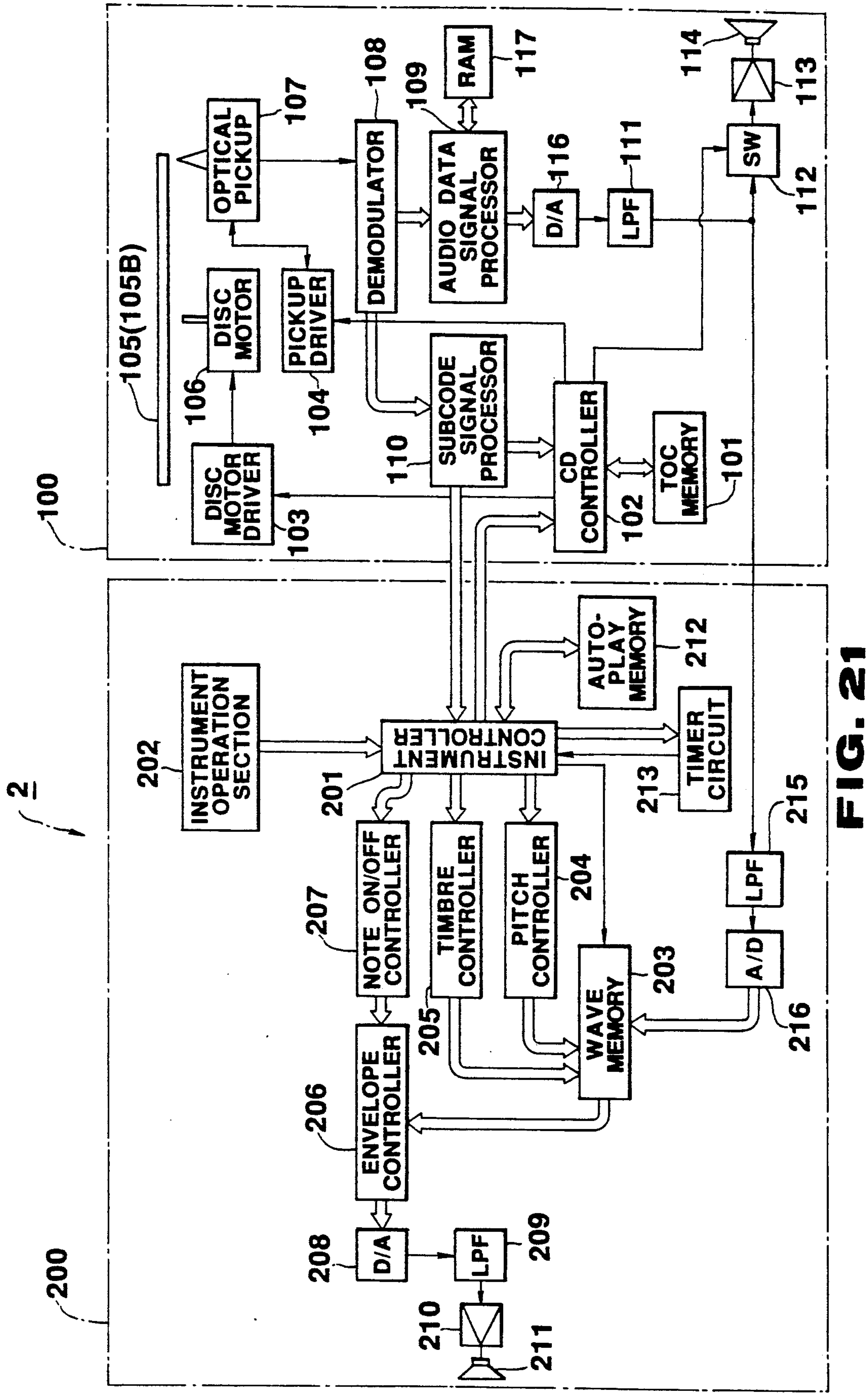
FIG. 21 is a block circuit diagram illustrating the general structure of the second embodiment of an auto-playing apparatus (2) according to the present invention.

FIG. 21 is a block diagram illustrating the general circuit arrangement of an auto-playing apparatus 2 or the second embodiment of the present invention, which is provided with an electronic keyboard instrument and a CD player.

As should be obvious from this diagram, the second embodiment of the auto-playing apparatus has almost the same structure as the first embodiment shown in FIG. 1, except for one part. Therefore, the same reference numerals as used in FIG. 1 are used to denote the identical elements and their description will be omitted.

The CD player section 100 in FIG. 21 has the same structure as the one shown in FIG. 1, with an exception that the output of the LPF 111 is also sent to an LPF 215 in the electronic keyboard instrument section 200 to permit sampling of a specific instrument sound recorded on the customized CD 105B and the sampled sound to be stored as timbre data in the wave memory 203.

The instrument operation section 202 in the electronic keyboard instrument section 200 has basically the same structure as the one shown in FIG. 2. In the second embodiment, however, the keyboard 202-1 having a plurality of keys 202-2, music designation keys 202-6, data read key 202-7, auto-play start key 202-9, timbre designation keys 202-11 and CD operation switches 202-12 are mainly used.

The wave memory 203 has a ROM in which wave data of various musical tones are stored in advance in the form of digital codes at a given sampling frequency in the PCM system, and a RAM having a sample sound storing area for sampling and storing an instrument sound (sample sound), recorded as audio data on the customized CD 105B, which will be described later. Through not particularly shown, the wave memory 203 has an address counter for accessing the ROM or RAM, and first and second address registers in which the initial value and accumulated value of this counter are respectively set.

The aforementioned LPF 215 and an A/D converter 216 are provided to store the instrument sound (sample sound) reproduced from the CD 105B, into the wave memory 203, which will be described below. Upon reading a sampling command from the auto-play memory 212, the instrument controller 201 sends this sampling command to the CD controller 102, as will be described later. In turn, the CD controller 102 controls the pickup driver 104 and disc motor driver 103 to control the driving of the optical pickup 107 and disc motor 106. The optical pickup 107 reproduces audio data of a specified sample sound from the customized CD 105B. The audio signal of the reproduced sample sound from the LPF 111 of the CD player section 100 is sent to the analog switch 112 and the LPF 215 in the electronic keyboard instrument section 200 at the same time.

In this case, the CD controller 102 performs such a control as to render the analog switch 112 off to thereby inhibit the analog signal from the LPF 111 from being output to the amplifier 113.

The LPF 215 eliminates a harmonics component, which has a frequency equal to or greater than ½ of the sampling frequency of sampling data (timbre data) to be stored in the wave memory 203, from the analog signal. This analog signal from the LPF 214 is output to the A/D converter 216 where it is converted into digital data (sampling data) having a predetermined number of quantized bits (16 bits in this embodiment). In a case where the sampling frequency at the time of the A/D conversion in the A/D converter 216 is made equal to the sampling frequency (44.1 KHz) in the D/A conversion in the CD player section 100, the A/D converter 216 and LPF 215 need not be provided as long as the output of the audio data signal processor 109 is directly written in the wave memory 203 in synchronism.

The sample sound converted in 16-bit digital data in the above manner is written in a memory area (RAM) associated with the sampling sound in the wave memory 203 under the control of the instrument controller 201.

CD Recording Format

The CD recording format has already been explained in the foregoing description of the first embodiment referring to FIGS. 3 through 9. Data is recorded in the same format on the customized CD 105B used in the second embodiment.

Figure 22:
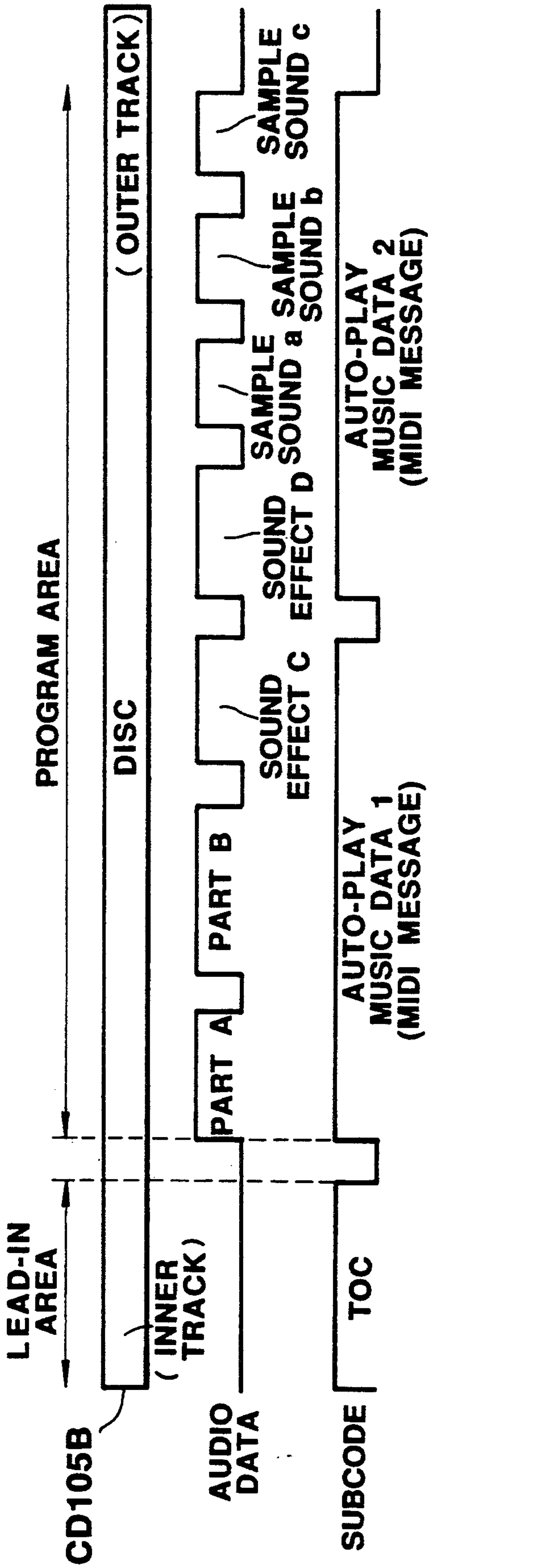
FIG. 22 is a diagram illustrating the recorded contents of a compact disc (105B) in the second embodiment.

FIG. 22 conceptually illustrates the recording status of audio data and a subcode on the customized CD 105B used in the second embodiment. First, TOC data is recorded in the subcode in the lead-in area of the CD 105B. The contents of the TOC data will be described later.

Auto-play music data 1 and auto-play data 2 are recorded in the named order in a subcode recording area in a program area (area between a diameter of 50 mm to 116 mm at the maximum) following the lead-in area, outward from the inner track. These data 1 and data 2 each consist of MIDI messages that conform to the MIDI standard. The contents of these auto-play music data will be described in detail later.

In an audio data recording area of the program area are recorded a part A, which is to be reproduced at the same time as the auto-playing of the auto-play music data 1 to provide an ensemble, and a part B for the auto-play music data 2. Following these parts A and B are a sound effect C (applause sound, sound of crowd on a street, sound of waves, etc.), which is to be reproduced at the same time as the auto-playing of the auto-play music data 1, followed by a sound effect D for the auto-play music data 2. Following the sound effect D, sample sounds a to c for use in controlling the timbres of the auto-play music data 1 and 2 are recorded.

The recorded contents of the TOC data will be described below. The recording format of the TOC data is as described earlier with reference to FIG. 5. As the TOC data, data of the absolute time from the starting point of data, which is indicated by a "POINT" is recorded. In the case of the customized CD 105B in the second embodiment, as shown in FIG. 23, the contents of data (see FIG. 22) recorded on the CD 105B are specified by the "POINT" and the absolute time data from the starting point of each piece of data is recorded. Accordingly, arbitrary data including the subcode can be accessed by referring to this TOC data.

FIGS. 24, 25(*a*) to 25(*d*) illustrate various types of MIDI messages used in the second embodiment.

FIG. 24 shows a voice message, which, as described with reference to the first embodiment, consists of a status byte 601 indicating the type of the message, and one or two data bytes 602 and 603 as control data for performing the tone control specified by the status byte.

In this embodiment, a note ON message 604, a note OFF message 605 and a program change message 606 are used as a voice message. The voice message has the same structure as that of the first embodiment shown in FIG. 12.

According to the second embodiment, a plurality of special commands as shown in FIGS. 25(*a*) to 25(*d*) are assigned as an exclusive message for CD-MIDI. The exclusive message is originally a message exclusive for a maker who has registered an ID code; however, a new ID for the CD-MIDI is set as the ID code to define the codes of various types of control commands in this embodiment. More specifically, an ID code for CD-MIDI, is used, and this ID code and several bytes of data are located between the status "F0" (expressed in a hexadecimal notation) and an end-of-exclusive (EOX) "F7" (also in a hexadecimal notation).

A sampling command 701 shown in FIG. 25(*a*) has a 6-byte structure consisting of "F0," "ID for CD-MIDI," "sampling command," "program number," "absolute time data from the starting point of a sample sound" and "F7." The sampling command 701 is a command to instruct accessing to a sample sound (see FIG. 22) based on the absolute time data from the starting point to reproduce this sample sound, and to sample the sample sound and store the sampled sound as timbre data indicated by the program number in a corresponding predetermined area in the wave memory 203 of the electronic keyboard instrument section 200.

A starting-point access command 702 shown in FIG. 25(*b*) has a 5-byte structure consisting of "F0," "ID for CD-MIDI," "starting-point access command," "absolute time data from the starting point of a part (sound effect)" and "F7." The starting-point access command 702 is a command to instruct the CD controller 102 in the CD player section 100 to access to a part or sound effect recorded in an audio data recording area on the CD 105B based on the absolute time data from the starting point and drive the optical pickup 107 to emit a laser beam at the starting point and be in a pause state.

A play command 703 shown in FIG. 25(*c*) has a 4-byte structure consisting of "F0," "ID for CD-MIDI," "play command" and "F7." This command 703 instructs the CD controller 102 to play audio data (part or sound effect) whose starting point has already been accessed in response to the starting-point access command 702.

A tone length control command 704 shown in FIG. 25(*d*) has a 5-byte structure consisting of "F0," "ID for CD-MIDI," "tone length control command," "tone length data" and "F7." The tone length control command 704 indicates the duration of a musical tone with the pitch specified by the note ON message 604, by means of the "tone length data"; this command is the same as the tone length control command 504 in the first embodiment shown in FIG. 12.

FIG. 26 exemplifies the auto-play music data 1 or 2 recorded as a subcode on the customized CD 105B. Sampling commands (701-1 to 701-30) are located at the beginning of the data. The number of the sampling commands is equal to the number of pieces of auto-play music. These sampling commands permit sample sounds reproduced from the CD 105B to be sampled and stored in the wave memory 203.

A program change (606-1) follows the sampling commands. At the time of auto-playing, based on the program change, the instrument controller 201 sends the program number (see 606 in FIG. 23) to the timbre controller 205 to designate a predetermined area in the wave memory 203 so that the waveform of the associated timbre is determined.

Following the program change is data consisting of a note ON message (604-1), a tone length control command (704-1) and a note OFF message (605-1) as a set. Based on these control data, the instrument controller 201 in FIG. 21 controls the auto-playing.

In order to reproduce a part and a sound effect from the CD 105B in synchronism during the auto-playing, a starting-point access command (702-1) and a play command (703-1) are included. In this case, the play command comes after the note ON message which should be synchronously reproduced during the auto-playing. The starting-point access command is located slightly before this play command. With the use of compact discs, a slight access time is required to move the optical pickup to the desired track. By accessing to the starting point of the desired data and setting the operational mode in a pause state in advance, CD reproduction can surely be done in response to the play command in synchronism with the auto-playing without any delay therebetween. Therefore, the starting-point access command needs to be located preceding the play command by the time required for accessing the CD.

The aforementioned program change message (606-2) is located at the position where the timbre is switched.

At the end of the music is a stop message stp by which the auto-playing is terminated and the instrument controller 201 returns to the normal mode from the guide-playing mode or auto-playing mode.

Operation

The operation of the thus constituted auto-playing apparatus will be described below.

Operation When CD is Mounted

When the CD 105B is mounted, this event is detected by a CD-mounting detection microswitch, sensor or the like (not shown) provided in the CD player section 100 near the CD-mounting portion thereof, and a detection signal is sent to the CD controller 102.

Upon reception of this detection signal, the CD controller 102 controls the disc motor driver 103 and pickup driver 104 to read data from the lead-in area on the CD 105B through the optical pickup 107. The output of the optical pickup 107 is EFM-modulated to be restored to an 8-bit symbol word (14-8 conversion) by the demodulator 108, and a subcode is output to the subcode signal processor 110.

The subcode signal processor 110 subjects the subcode to error correction and a de-interleaving process and outputs the control bits Q in the subcode to the CD controller 102.

The CD controller 102 reconstructs the control bits Q in the TOC format shown in FIG. 5 and detects TOC data. With the use of the customized CD 105B, this TOC data includes absolute time data from the starting points of the auto-play music data 1 and 2 recorded in the subcode recording area in the program area, and absolute time data from the starting points of parts A and B, sound effects C and D, and sample sounds a to c, recorded in the audio data recording area in the program area. This TOC data is stored in the TOC memory 101. The CD controller 102 controls access to each piece of data on the CD 105B, based on the TOC data.

Operation At the Time of Auto-playing

As shown in FIGS. 27(*a*) and 27(*b*), the auto-playing is executed by operating the music designation keys 202-6 and data read key 202-7 of the instrument operating section 202 of the electronic keyboard instrument section 200 to select either the auto-play music data 1 or 2, then operating the auto-play start key 202-9. The following description is given for a case where the auto-play music data 1 has been selected by the switch operation shown in FIG. 27(*a*).

When the switch operation shown in FIG. 27(*a*) is carried out, switch operation signals associated with this operation are output to the CD controller 102 which detects by the switch operation signals that auto-playing of the auto-play music data 1 has been instructed. First, based on the TOC data of the selected auto-play music data 1 stored in the TOC memory 101, the CD controller 102 controls the pickup driver 104 to move the optical pickup 107 to the position of the recorded auto-play music data 1 on the CD 105B, which is indicated by the absolute time data from the starting point. At this time, the CD controller 102 controls the disc motor driver 103 to control the rotational speed of the CD 105B, so that the linear velocity at that position becomes constant. The optical pickup 107 reproduces the auto-play music data 1 recorded in the program area on the CD 105B. At this time, the CD controller 102 sets the analog switch 112 off to prevent the reproduced sound of the part or sound effect recorded in the audio data recording area from being generated as a sound.

The output signal of the optical pickup 107 is input to the demodulator 108 where it is subjected to EFM demodulation to be converted into an 8-bit symbol word. The demodulator 108 selects a subcode from the symbol word and outputs it to the subcode signal processor 110. Upon reception of this subcode, the signal processor 110 constructs the subcoding frame shown in FIG. 4 in addition to the packs shown in FIGS. 7 and 9, and performs error detection and error correction based on the parities $P_0$–$P_2$ and parities $Q_0$–$Q_4$ of the packs. Six bits R to W of the symbols 4 to 19 of the pack structure shown in FIG. 9 are sent to the instrument controller 201.

This controller 201 separates the six bits R–W sequentially input from the subcode signal processor 110 in the units of 8 bits to prepare MIDI messages and sequentially writes the messages into the auto-play memory 212 (see FIG. 26).

The CD controller 102 executes the above-described control operation to write the subcode, data of the auto-play music data 1, into the auto-play memory 212 until it receives the stop message included in the auto-play music data.

While the MIDI messages of the auto-play music data 1 are being written in the auto-play memory 212 under the control of the instrument controller 201, the demodulator 108 is outputting symbol words of audio data of the part A, part B and sound effect C to the audio data signal processor 109. This signal processor 109 subjects the received symbol words to de-interleaving and error detection/error correction to restore audio data. The restored audio data is converted into an analog audio signal for each 16-bit sample word by means of the D/A converter 116 and LPF 111, and the analog audio signals are sequentially output to the analog switch 112. As the analog switch 112 is set off as described above, the part A, part B, and sound effect C will not be generated as sounds.

When the instrument controller 201 completes writing of every MIDI message of the auto-play music data 1 into the auto-play memory 212, it sequentially reads out the MIDI messages therefrom and executes the auto-playing of the auto-play music data 1 based on the messages.

A description will now be given of the auto-playing operation performed while the MIDI messages (see FIG. 26) are sequentially read out from the auto-play memory 212 under the control of the instrument controller 201.

Upon reading the sampling command 701-1 from the auto-play memory 212, the instrument controller 201 sends the "sampling command" and "absolute time data from the starting point of a sample sound" to the CD controller 102. The controller 201 also sets the wave memory 203 in a data writing state and sends the "program number" to the timbre controller 205 to specify a storage area in the wave memory 203 which corresponds to the "program number." The controller 201 further sets the analog switch 112 off.

The CD controller tone 102 controls the disc motor driver 103 and pickup driver 104 to reproduce sample sounds, recorded in the area following the frame corresponding to the "absolute time data from the starting point of a sample sound," from the audio data recording area on the CD 105B. The sample sound specified by the sampling command 701-1 is reproduced by the demodulator 108, audio data signal processor 109, D/A converter 116 and LPF 111.

The sample sound output from the LPF 111 is sent to the LPF 215 in the electronic keyboard instrument section 200 and is quantized by the A/D converter 216 after its harmonics component having a frequency equal to or greater than ½ of the sampling frequency is removed. The instrument controller 201 sequentially writes the sampling data of the sample sound quantized by the A/D converter 216 into the associated memory area in the wave memory 203.

Thereafter, the instrument controller 201 reads out the sampling commands 701-2 and 701-3 in the same manner. As in the case of the sampling command 701-1, sample sounds specified by these sampling commands 701-2 and 701-3 are reproduced from the CD 105B under the control of the CD controller 102, and quantized sampling data are written in the associated memory areas in the wave memory 203 under the control of the instrument controller 201. As the analog switch 112 is set off, the sample sounds to be reproduced, which are specified by the sampling commands 701-2 and 701-3, are not generated as sounds.

Then, the instrument controller 201 reads out the program change 606-1 from the auto-play memory 212 and outputs the program number specified by the program change message to the timbre controller 205. In turn, the controller 205 sets the head address of the memory area in the wave memory 203 where timbre data corresponding to the program number, in the first address register in the wave memory 203.

The timbre data specified by the MIDI message of the program change 606-1 is either wave data of a timbre stored in advance in the wave memory 203 or timbre data, which corresponds to a sample sound read out from the audio data recording area of the CD 105B and newly stored in the wave memory 203 in response to the sampling commands 701-1 to 701-3 included in the auto-play music data 1.

Through the above operation, one piece of timbre data is specified from plural pieces of timbre data stored in the wave memory 203.

Then, the instrument controller 201 reads out the MIDI message of the note ON message 604-1, outputs the pitch data corresponding to the note number of the note ON message to the scale controller 204, and outputs the note ON data and velocity data to the note ON/OFF controller 207.

The scale controller 204 sets the address interval value corresponding to the input pitch data into the second address register in the wave memory 203, controls the address counter in the wave memory 203 to sequentially accumulate the address of the wave memory 203 at a predetermined period by a value set in the second address register, and adds the read signal to the wave memory 203. Consequently, peak values of the wave data (sampling data) of the timbre designated by the program change 606-1 are sequentially read out at given sampling intervals and output to the envelope controller 206. When the note ON data and velocity data are added, the controller 207 controls the envelope controller 206 to generate an envelope having an attack time corresponding to the velocity data. The envelope controller 206 multiplies the envelope generated itself by the peak value of the wave data output from the wave memory 203, and outputs the resultant value to the D/A converter 208.

Through the above operation, a musical tone having a pitch corresponding to the note number is produced with the envelope having an attack time corresponding to the velocity data and at the timbre designated by the program change 606-1, and is generated as a sound via the loudspeaker 211, in response to the MIDI message of the note ON 604-1.

Then, the instrument controller 201 reads out the MIDI message of the tone length control command 704-1 from the auto-play memory 212. Upon reading the tone length control command 704-1, the instrument controller 201 outputs the tone length data to the timer circuit 213 to start the circuit 213.

The timer circuit 213 counts the time corresponding to the input tone length data and outputs a coincidence signal to the instrument controller 201 upon elapse of the time.

The instrument controller 201 waits until the coincidence signal from the timer circuit 213 is applied. When applied with this coincidence signal, the controller 201 reads out the note OFF 605-1 as the next MIDI message from the auto-play memory 212, then outputs the note OFF signal and OFF velocity data to the note ON/OFF controller 207. Upon reception of the note OFF signal and OFF velocity data, the note ON/OFF controller 207 controls the envelope controller 206 and attenuates the envelope from the envelope controller 206 by the release time corresponding to the OFF velocity data.

As described above, based on three MIDI messages, namely, the note ON 604-1, tone length control command 704-1 and note OFF 605-1, a musical tone with the pitch specified by the note ON 604-1 is generated for a period of time specified by the tone length control command 704-1. The timbre of the musical tone to be generated becomes what is specified by the immediately preceding program change 606-1, and the envelope is determined by the velocity data of the note ON 604-1 and OFF velocity data of the note OFF 605-1.

Subsequently, the instrument controller 201 sequentially reads out the note ON 604-2, tone length control command 704-2 and note OFF 605-2 and generates the musical tone at the pitch specified by the note ON 604-2 with the timbre specified by the program change 606-1 for a period of time designated by the tone length control command 704-2.

In the above manner, MIDI messages having the note ON 604, tone length control command 704 and note OFF 605 as a set are sequentially read out from the auto-play memory 212 and auto-playing of part of a predetermined melody is performed.

After part of a melody is auto-played in the above manner, the instrument controller 201 reads the program change 606-2 from the auto-play memory 212. The controller 201 then sets the head address of a memory area in the wave memory 203 where the wave data of the timbre corresponding to the program number specified by the program change 606-2 is stored, into the first address in the memory 203.

Then, the instrument controller 201 reads out the note ON 604-3 from the auto-play memory 212, tone length control command 704-3 and note OFF 605-3 from the auto-play memory 212, and likewise generates a musical tone at the pitch specified by the note ON 604-3 with the timbre specified by the program change 606-2 for a period of time designated by the tone length control command.

The instrument controller 201 further sequentially reads the MIDI messages from the auto-play memory 212, and reads out the starting-point access command 702-1 after reading out the note ON 604-4. Upon reading the starting-point access command 702-1, the controller 201 sends two pieces of data, "starting-point access command" and "absolute time data from the starting point of a part (sound effect)," included in the command 702-1, to the CD controller 102.

Upon reception of the "starting-point access command," the CD controller 102 controls the pickup driver 104 to move the optical pickup 107 to the position to emit the laser beam on the starting point of the frame in which the part or sound effect specified by the "absolute time data from the starting point from the part (sound effect)," and, at the same time, controls the rotational speed of the disc motor 106 via the disc motor driver 103, so that data can be reproduced from the CD 105B at a constant linear velocity (pause state).

Through the above operation, the optical pickup 107 is positioned at the starting point of the frame specified by the "absolute time data from the starting point of a part (sound effect)" in response to the MIDI message of the starting-point access command, and the driving of the CD 105B is controlled so as to make the linear velocity of the frame equal to a predetermined linear velocity. At this time, the instrument controller 201 reads out the tone length control command 704-4 and note OFF 605-4 from the auto-play memory 212, and generates a musical tone at the pitch specified by the note ON 604-4 for a period of time corresponding to the tone length data specified by the tone length control command 704-4 in the above-described manner.

The instrument controller 201 further sequentially reads out the MIDI messages from the auto-play memory 212 and performs tone generation control associated with the read-out MIDI messages. Then, the controller 201 reads out the note ON 604-5 and likewise generates a musical tone at the pitch specified by the note ON 604-5 with an envelope having an attack time corresponding to the velocity data of the note ON 604-5, then reads out the play command 703-1 from the auto-play memory 212. The controller 201 sends the play command to the CD controller 102 and sets the analog switch 112 on from the OFF state.

Upon reception of the play command, the CD controller 102 controls the disc motor driver 103 and pickup driver 104 to start reproducing the audio data from the beginning of the frame whose starting point has been accessed and set in the pause state by the starting-point access command 702-1. This audio data is subjected to error detection/error correction and deinterleaving in the audio data signal processor 109, and is then converted into an analog audio signal by the D/A converter 116 and LPF 111. This signal is then generated outside as a sound through the analog switch 112, which is set on, the amplifier 113 and loudspeaker 114.

Through the above operation, the part (part A or B) or sound effect (sound effect A or B) whose starting point has been accessed by the starting-point access command 702-1, is reproduced by the CD player section 100 in synchronism with the auto-paying.

Based on the control bits P included in the subcode from the subcode signal processor 110, the CD controller 102 discriminates whether or not reproduction of the part or sound effect is presently in progress (between music when P is "1" and music when P is "0"); the controller 102 discriminates the end of the part or sound effect by detecting the point where P changes to "1" from "0." Upon detecting the end of the part or sound effect, the controller 102 controls the disc motor driver 103 and pickup driver 104 to stop data reproduction from the CD 105B and sets the optical pickup 107 to the predetermined initial position. The instrument controller 201 terminates the above-described auto-playing sequence upon reading the stop message from the auto-play memory 212.

As described above, providing two exclusive messages as control data for a piece of auto-play music, the starting-point access command 702 and play command 703, conforming to the MIDI standard, can ensure reproduction of a part or sound effect recorded on the CD 105B, during the auto-playing in synchronism therewith.

In other words, since the optical pickup is moved in advance to the starting point of the frame where the desired part or sound effect is recorded by the starting-point access command 702 (starting-point accessing operation), the CD player section can reproduce this part or sound effect immediately in response to the play command 703.

Accordingly, an ensemble with a part (part A or B) recorded on the CD 105B can be provided in synchronism with the auto-playing. Further, sound effects (sound effects C and D), such as an applause sound, sound of crowd on a street, and sound of waves, can be reproduced by the CD player section 100 and added to the auto-playing executed by the electronic keyboard instrument section 200. In addition, it is possible to sample a sample sound (sample sound 1, b or c) recorded in the audio data recording area on the CD 105B, and store it as timbre data in advance into the wave memory 203 of the electronic keyboard instrument section 200, whereby auto-playing is executed with the timbre of that sample sound.

Modifications of First Embodiment

Although a CD is used as a recording medium for audio data, such as parts and sound effects, and auto-play music data in the second embodiment, an audio tape such as DATA in which digital data digital-coded with a predetermined number of quantized bits by the PCM system, a compact cassette tape which can provide 4-track, 2-channel stereo recording, and a rewritable optical disk may be used as well.

Reproduction of a piece of music from a CD and reproduction of auto-play music data can start at the same time in the second embodiment by providing the starting-point access command before the first note ON message and providing the play command next to or immediately preceding the first note ON message.

The auto-play data is not limited to a MIDI message which conforms to the MIDI standard, but has only to be tone control data of a predetermined specification. In addition, the auto-play data may be recorded in the CD-ROM recording format, not in the subcode recording area. In this case, the audio data, such as a part and a sound effect, should be recorded in the CD-ROM recording format.

What is claimed is:

1. An apparatus for performing auto-playing in synchronism with reproduction of audio data using a recording medium for recording the audio data, comprising:

storing means for storing auto-play data;

auto-playing means, coupled to said storing means, for reading said auto-play data therefrom and for sequentially generating corresponding musical tone signals;

reproducing means, coupled to said recording medium, for reproducing said audio data therefrom;

control means, coupled to said auto-playing means and to said reproducing means, for outputting a control signal to access to a starting point of audio data to be reproduced, to said reproducing means before outputting a start signal, and for controlling said auto-playing means and said reproducing means in response to said start signal to synchronize the start of reproduction of the audio data from said starting point which has already been accessed to, with the start of auto-playing of said auto-play data.

2. An auto-playing apparatus according to claim 1, wherein said auto-play data comprises at least data for designating a pitch of a musical tone, data for designating a tone length of said musical tone and musical tone data as a set for each musical tone, and also includes time data representing a time from the beginning of reproduction of said recording medium to the beginning of a first tone generation by auto-playing, said time data being located preceding to musical tone data corresponding to a first musical tone;

said control means controls said reproducing means to start reproducing said recording medium in response to said start signal and controls said auto-playing means to sequentially read out auto-play data including said time data from said storing means in response to said start signal; and upon reading said time data from said storing means, said auto-playing means reads out first musical data upon elapse of a time corresponding to said time data, and, thereafter, reads out a succeeding, series of musical data sequentially from said storing means to generate musical tone signals associated with individual musical tones to thereby perform said auto-playing.

3. An auto-playing apparatus according to claim 1, wherein said start signal is generated by operating a start switch.

4. An auto-playing apparatus according to claim 1, wherein said auto-play data stored in said storing means includes musical tone data corresponding to a specific melody portion of a piece of music; and said audio data recorded on said recording medium is audio data of said piece of music including said specific melody portion.

5. An auto-playing apparatus according to claim 1, wherein audio data for plural pieces of music are recorded on said recording medium;

said control means selects one of said plural pieces of music in accordance with a select signal applied prior to said start signal, and outputs a control signal to access a starting point of said selected audio data to said reproducing means; and said reproducing means accesses said starting point of said selected audio data in response to said control signal and starts reproducing said audio data from said starting point thereof which has already been accessed to, in response to said start signal.

6. An auto-playing apparatus according to claim 1, wherein said auto-playing means generates an indication signal to indicate a key position on a keyboard, corresponding to said musical tone signal; and said control means controls said auto-playing means to selectively execute an auto-playing function for generating a corresponding musical tone based on said musical tone signal and a guide-playing function for indicating a corresponding key position on said keyboard based on said indication signal.

7. An apparatus for performing auto-play in synchronism with reproduction of audio data using a recording medium having a first subarea for recording audio data and a second subarea for recording auto-play data, comprising:

storing means for storing auto-play data;

auto-playing means, coupled to said storing means, for reading said auto-play data therefrom and for sequentially generating corresponding musical tone signals;

reproducing means, coupled to said recording medium, for reproducing said audio data therefrom;

control means, coupled to said auto-playing means and to said reproducing means, for controlling said reproducing means to reproduce said auto-play data recorded in said subarea and to store said reproduced auto-play data into said storing means, for outputting a control signal to access to a starting point of audio data to be reproduced, to said reproducing means before outputting a start signal, and for controlling said auto-playing means and said reproducing means in response to said start signal to synchronize the start of reproduction of the audio data from said starting point which has already been accessed to, with the start of auto-playing of said auto-play data.

8. An auto-playing apparatus according to claim 7, wherein audio data for plural pieces of music are recorded in said main area of said recording medium and auto-play data for plural pieces of music are recorded in said subarea;

said control means selects one of said audio data for plural pieces of music and one of said auto-play data for plural pieces of music in response to a select signal given prior to said start signal, and outputs a control signal to access to a starting point of said selected auto-play data to said reproducing means;

said reproducing means accesses said starting point of said selected auto-ply data in response to said control signal to start reproducing said auto-play data from said accessed starting point;

said control means performs control to store said reproduced auto-play data into said memory means, then outputs a control signal to access said starting point of said selected audio data to said reproducing means; and said reproducing means accesses said starting point of said selected audio data in response to said control signal to start reproducing said signal processor from said starting point which has already been accessed, in response to said start signal, while said auto-playing means reads out said auto-play data from said storing means in response to said start signal to thereby start said auto-playing.

9. An auto-playing apparatus according to claim 7, wherein audio data for at least two channels are recorded in said main area of said recording medium in such a way that audio data excluding a specific melody part A of a piece of music is recorded in a first channel and audio data excluding a specific melody part B of said piece of music is recorded in a second channel, and at least auto-play data for said melody part A and auto-play data for said melody part B are recorded in said subarea;

said control means selects one of said audio data for two channels and selects auto-play data corresponding to said melody part excluded from said selected audio data, in response to a select signal given prior to said start signal, and outputs a control signal to access to a starting point of said selected auto-play data to said reproducing means;

said reproducing means accesses said starting point of said selected auto-play data in response to said control signal to start reproducing said auto-play data from said accessed starting point;

said control means performs control to store said reproduced auto-play data into said storing means, then outputs a control signal to access said starting point of said selected audio data to said reproducing means; and said reproducing means accesses said starting point of said selected audio data in response to said control signal to start reproducing said signal processor from said starting point which has already been accessed, in response to said start signal, while said auto-playing means reads out said auto-play data from said storing means in response to said start signal to thereby start said auto-playing.

10. An auto-playing apparatus according to claim 7, wherein said recording medium is a compact disc, and said audio data is recorded in an audio data area in a frame format of said compact disc while said auto-play data is recorded in a subcode area.

11. An auto-playing apparatus according to claim 10, wherein said auto-play data is recorded in a subcoding frame comprised of subcodes R to W of said subcode area.

12. An auto-playing apparatus according to claim 11, wherein said auto-play data is recorded as a MIDI message in said subcoding frame.

13. An apparatus for performing guide indication in synchronism with reproduction of audio data using a recording medium for recording the audio data, comprising:

storing means for storing auto-play data;

guide indicating means, coupled to said storing means, for reading said auto-play data therefrom and for sequentially generating an indication signal for indicating a corresponding key position on a keyboard, thereby providing a guide indication;

reproducing means, coupled to said recording medium, for reproducing said audio data therefrom;

control means, coupled to said guide indicating means and to said reproducing means, for outputting a control signal to access to a starting point of audio data to be reproduced, to said reproducing means before outputting a start signal, and for controlling said guide indicating means and said reproducing means in response to said start signal to synchronize the start of reproduction of the audio data from said starting point which has already been accessed to, with the start of guide indication of said auto-play data.

14. An auto-playing apparatus according to claim 13, wherein said auto-play data comprises at least data for designating a pitch of a musical tone, data for designating a tone length of said musical tone and musical tone data as a set for each musical tone, and also includes time data representing a time from the beginning of reproduction of said recording medium to the beginning of indication of a first key position by said guide indication, said time data being located preceding to musical tone data corresponding to a first musical tone;

said control means controls said reproducing means to start reproducing said recording medium in response to said start signal and controls said guide indicating means to sequentially read out auto-play data including said time data from said storing means in response to said start signal; and upon reading said time data from said storing means, said guide indicating means reads out first musical data upon elapse of a time corresponding to said time data, and, thereafter, reads out a succeeding, series of musical data sequentially from said storing means to generate indication signals associated with individual musical tones to thereby provide guide indication.

15. An apparatus for performing auto-play in synchronism with reproduction of audio data using a recording medium for recording the audio data, comprising:

reproducing means, coupled to said recording medium, for reproducing said audio data from said recording medium;

storing means for storing auto-play data, which includes musical tone data and a play command, provided in association with predetermined musical tone data, for playing audio data to be recorded in said recording medium;

auto-play means, coupled to said storing means, for reading said auto-play data therefrom and for sequentially generating corresponding musical tone signals, thereby executing auto-playing; and control means, coupled to said auto-playing means and to said reproducing means, for controlling said auto-playing means to start auto-playing based on said auto-play data in response to a start signal and for sending a play control signal to said reproducing means upon detection of reading of said play command from said storing means to thereby start reproduction of said recording medium.

16. An auto-playing apparatus according to claim 15, wherein said control means outputs an access control signal to access to a starting point of audio data to be reproduced, to said reproducing means before outputting said play control signal thereto; and said reproducing means accesses said starting point of said audio data to be reproduced in response to said access control signal and starts reproducing said audio data from said starting point, which has already accessed to, in response to said play command.

17. An auto-playing apparatus according to claim 15, wherein said auto-play data further includes an access command for accessing a starting point of audio data to be recorded on said recording medium, said access command being located at a predetermined position before a location of said play command;

said control means outputs an access control signal for accessing to a starting point of audio data to be reproduced to said reproducing means upon detection of reading of said access command; and said reproducing means accesses said starting point of said audio data to be reproduced in response to said access command and starts reproducing said audio data from said starting point which has already been accessed, in response to said play command.

18. An auto-playing apparatus according to claim 17, wherein plural sets of audio data are recorded on said recording medium; and said access command includes data for indicating a recording position of a starting point of any of said plural sets of audio data.

19. An auto-playing apparatus according to claim 15, wherein said start signal is generated by operation of a start switch.

20. An auto-playing apparatus according to claim 15, wherein said audio data recorded on said recording medium corresponds to a specific melody part of a piece of music; and said auto-play data stored in said storing means is auto-play data excluding said specific melody part.

21. An auto-playing apparatus according to claim 15, wherein plural sets of audio data are recorded on said recording medium;

said control means selects one of said plural sets of audio data before outputting said play control signal to said reproducing means, and outputs an access control signal to access a starting point of said selected audio data to said reproducing means; and said reproducing means accesses said starting point of said selected audio data in response to said access control signal and starts reproducing said audio data from said starting point thereof which has already been accessed to, in response to said play command.

22. An auto-playing apparatus according to claim 21, wherein said audio data recorded on said recording medium is audio data of a piece of music and/or audio data of a sound effect.

23. An auto-playing apparatus according to claim 15, wherein said recording medium has a subarea for recording auto-play data in addition to a main area for recording audio data; and said control means controls said reproducing means to reproduce said auto-play data recorded in said subarea and stores said reproduced auto-play data into said storing means.

24. An auto-playing apparatus according to claim 15, wherein audio data for plural pieces of music are recorded in said main area of said recording medium and auto-play data for plural pieces of music are recorded in said subarea;

said control means selects one of said audio data for plural pieces of music in response to a select signal given prior to said start signal, and outputs a control signal to access to a starting point of said selected auto-play data to said reproducing means;

said reproducing means access said starting point of said selected auto-play data in response to said control signal to start reproducing said auto-play data from said accessed starting point; and said control means performs control to store said reproduced auto-play data into said storing means.

25. An auto-playing apparatus according to claim 23, wherein said recording medium is a compact disc, and said audio data is recorded in an audio data area in a frame format of said compact disc while said auto-play data is recorded in a subcode area.

26. An auto-playing apparatus according to claim 25, wherein said auto-play data is recorded in a subcoding frame comprised of subcodes R to W of said subcode area.

27. An auto-playing apparatus according to claim 26, wherein said auto-play data is recorded as a MIDI message in said subcoding frame.

28. An apparatus for performing auto-play in synchronism with reproduction of audio data using a recording medium for recording the audio data, comprising:

reproducing means, coupled to said recording medium, for reproducing an audio signal corresponding to the audio data recorded on said recording medium;

wave data storing means for storing wave data for determining a timbre;

wave data converting means, coupled to said reproducing means and to said wave data storing means, for sampling the audio signal output from said reproducing means to be converted into wave data and for storing said wave data into said wave data storing means;

storing means for storing auto-play data including musical tone data having at least data for designating a pitch of a musical tone and data for specifying a tone length of said musical tone, and including a sampling command located preceding to said series of musical tone data;

auto-playing means, coupled to said storing means and to said wave data storing means, for reading said auto-play data therefrom and for reading wave data from said wave data storing means based on said read-out auto-play data to thereby sequentially generate corresponding musical tone signals for auto-playing; and control means, coupled to said auto-playing means, to said wave data converting means and to said reproducing means, for controlling said auto-playing means in response to a start signal to start reading said auto-playing data, for sending a play control signal to said reproducing means to reproduce data from said recording medium upon detection of reading said sampling command from said storing means, and for controlling said wave data converting means to sample and convert said audio data play signal from said reproducing means into wave data, and for storing said wave data into said wave data storing means.

29. An auto-playing apparatus according to claim 28, wherein plural sets of audio data are recorded on said recording medium;

said sampling command includes data for indicating a recording position of a starting point of any of said plural sets of audio data;

upon detection of said sampling command, said control means outputs to said reproducing means said play control signal to access a starting point of audio data to be reproduced for data reproduction based on said recording-position indicating data included in said sampling command; and said reproducing means accesses said starting point of said audio data to be reproduced in response to said play control signal to start reproducing said audio data from said starting point.

30. An auto-playing apparatus according to claim 28, wherein plural sets of audio data are recorded on said recording medium;

said wave data storing means has a plurality of recording areas for storing wave data;

said sampling command includes data for indicating a recording position of a starting point of any of said plural sets of audio data and timbre number designating data;

said auto-play data includes a timbre number switching command at a given position; and upon detection of said sampling command, said control means outputs to said reproducing means said play control signal to access a starting point of audio data to be reproduced for data reproduction based on said recording-position indicating data included in said sampling command, and performs such a control as to control said wave data converting means based on said timbre number designating data included in a play command and store sampling-originated wave data into that recording area of said wave data storing means which is specified by said timbre number designating data.

31. An auto-playing apparatus according to claim 28, wherein said recording medium has a subarea for recording auto-play data in addition to a main area for recording audio data; and said control means controls said reproducing means to reproduce said auto-play data recorded in said subarea and stores said reproduced auto-play data into said storing means.

32. An auto-playing apparatus according to claim 28, wherein audio data is recorded in said main area of said recording medium and auto-play data for plural pieces of music are recorded in said subarea;

said control means selects one of said auto-play data for plural pieces of music in response to a select signal given prior to said start signal, and outputs a control signal to access to a starting point of said selected auto-play data to said reproducing means;

said reproducing means accesses said starting point of said selected auto-play data in response to said control signal to start reproducing said auto-play data from said accessed starting point; and said control means performs control to store said reproduced auto-play data into said storing means.

33. An auto-playing apparatus according to claim 31, wherein said recording medium is a compact disc, and said audio data is recorded in an audio data area in a frame format of said compact disc while said auto-play data is recorded in a subcode area.

34. An auto-playing apparatus according to claim 33, wherein said auto-play data is recorded in a subcoding frame comprised of subcodes R to W of said subcode area.

35. An auto-playing apparatus according to claim 34, wherein said auto-play data is recorded as a MIDI message in said subcoding frame.

36. An apparatus for performing auto-play in synchronism with reproduction of performance data using a recording medium for recording the performance data, comprising:

storing means for storing auto-play data;

auto-playing means, coupled to said storing means, for reading said auto-play data therefrom and for sequentially generating corresponding musical tone signals;

reproducing means, coupled to said recording medium, for reproducing said performance data therefrom;

control means, coupled to said auto-playing means and to said reproducing means, for outputting a control signal to access to a starting point of audio data to be reproduced, to said reproducing means before outputting a start signal, and for controlling said auto-playing means and said reproducing means in response to said start signal to synchronize the start of reproduction of the performance data from said starting point which has already been accessed to, with the start of auto-playing of said auto-play data.

37. An apparatus for performing auto-play in synchronism with reproduction of performance data using a recording medium having a first subarea for recording performance data and a second subarea for recording auto-play data, comprising:

storing means for storing auto-play data;

auto-playing means, coupled to said storing means, for reading said auto-play data therefrom and for sequentially generating corresponding musical tone signals;

reproducing means, coupled to said recording medium, for reproducing said audio data therefrom;

control means, coupled to said auto-playing means and to said reproducing means, for controlling said reproducing means to reproduce said auto-play data recorded in said subarea and to store said reproduced auto-play data into said storing means, for outputting a control signal to access to a starting point of performance data to be reproduced, to said reproducing means before outputting a start signal, and for controlling said auto-playing means and said reproducing means in response to said start signal to synchronize the start or reproduction of the performance data from said starting point which has already been accessed to, with the start of auto-playing of said auto-play data.

38. An apparatus for performing guide indication in synchronism with reproduction of performance data using a recording medium for recording the performance data, comprising:

storing means for storing auto-play data;

guide indicating means, coupled to said storing means, for reading said auto-play data therefrom and for sequentially generating an indication signal for indicating a corresponding key position on a keyboard, thereby providing a guide indication;

reproducing means, coupled to said recording medium, for reproducing said performance data therefrom;

control means, coupled to said guide indicating means and to said reproducing means, for outputting a control signal to access to a starting point of audio data to be reproduced, to said reproducing means before outputting a start signal, and for controlling said guide indicating means and said reproducing means in response to said start signal to synchronize the start of reproduction of the performance data from said starting point which has already been accessed to, with the start of the guide indication of said auto-play data.

39. An apparatus for performing auto-play in synchronism with reproduction of performance data using a recording medium for recording the performance data, comprising:

reproducing means, coupled to said recording medium, for reproducing said performance data from said recording medium;

storing means for storing auto-play data, which includes musical tone data and a play command, provided in association with predetermined musical tone data, for playing performance data to be recorded in said recording medium;

auto-playing means, coupled to said storing means, for reading said auto-play data therefrom and for sequentially generating corresponding musical tone signals, thereby executing auto-playing; and control means, coupled to said auto-playing means and to said reproducing means, for controlling said auto-playing means to start auto-playing based on said auto-play data in response to a start signal, and for sending a play control signal to said reproducing means upon detection of reading of said play command from said storing means to thereby start reproduction of said recording medium.

* * * * *